US011412149B1

(12) United States Patent
Gandhi

(10) Patent No.: US 11,412,149 B1
(45) Date of Patent: Aug. 9, 2022

(54) AUTONOMOUS POSITIONING SYSTEM FOR IN INTERCHANGEABLE CAMERA DEVICES

(71) Applicant: Mehul Gandhi, Reston, VA (US)

(72) Inventor: Mehul Gandhi, Reston, VA (US)

(*) Notice: Subject to any disclaimer, the term of this patent is extended or adjusted under 35 U.S.C. 154(b) by 0 days.

(21) Appl. No.: 17/069,656

(22) Filed: Oct. 13, 2020

Related U.S. Application Data

(60) Provisional application No. 62/913,333, filed on Oct. 10, 2019.

(51) Int. Cl.
H04N 5/74 (2006.01)
H04N 5/44 (2011.01)
H04N 5/64 (2006.01)
H04N 5/232 (2006.01)
H04N 5/225 (2006.01)
G06V 10/22 (2022.01)

(52) U.S. Cl.
CPC ......... *H04N 5/23299* (2018.08); *G06V 10/22* (2022.01); *H04N 5/2253* (2013.01); *H04N 5/23287* (2013.01); *H04N 5/232127* (2018.08)

(58) Field of Classification Search
CPC ............. H04N 5/23299; H04N 5/2253; H04N 5/23287; H04N 5/232127; H04N 5/23203; H04N 5/23258; H04N 5/222; H04N 5/74; H04N 5/44; H04N 5/64; H04N 21/44218; G06K 9/2054; G06F 3/011; G06F 3/033; G09F 11/00
See application file for complete search history.

(56) References Cited

U.S. PATENT DOCUMENTS

| 8,704,904 B2 * | 4/2014 | Boyle | H04N 5/23203 348/211.99 |
| 9,723,192 B1 * | 8/2017 | Sammons | F16M 11/18 |
| 2008/0055413 A1 * | 3/2008 | Hayashi | H04N 5/23296 348/169 |
| 2015/0071627 A1 * | 3/2015 | Hoang | F16M 11/10 396/421 |

(Continued)

Primary Examiner — Patrick E Demosky
(74) Attorney, Agent, or Firm — Attentive Law; Paul Ratcliffe

(57) ABSTRACT

The invention provides a positioning system that autonomously and continuously positions interchangeable camera devices on the subject as they move allowing the camera device to leverage its native functionality without modification or connectivity to the MTDS. The embodiments of the MTDS are configured to attach and align varying size of digital cameras, video cameras, mobile devices with a camera, or smart assistants with an embedded camera, action camera, webcam or laptop with embedded camera to the stand. The MTDS tracks the movements of the user during any video conference, photography or videography session. The MTDS includes a sensor, separate from the camera on the camera device, that sends the sensor data stream to a microcontroller in the stand and a machine learning co-processor detects the presence of a person. As the speaker or subject (user) moves, the MTDS tracks their movements and directs motors in the stand to pan or tilt the stand to orient the camera device's camera at the user. Through movement of the stand, the speaker or user stays centered in the camera frame. No data connections or software integrations are required to operate the MTDS.

23 Claims, 14 Drawing Sheets

(56) References Cited

U.S. PATENT DOCUMENTS

| | | | | |
|---|---|---|---|---|
| 2016/0330363 A1* | 11/2016 | Bevirt | ................... | F16M 11/041 |
| 2016/0352992 A1* | 12/2016 | Saika | ................... | F16M 11/041 |
| 2016/0381271 A1* | 12/2016 | Cheng | .................... | F16M 13/00 |
| | | | | 348/208.2 |
| 2019/0132514 A1* | 5/2019 | Ibi | ....................... | H04N 5/23258 |
| 2020/0228692 A1* | 7/2020 | Wakamatsu | ........... | H04N 5/232 |
| 2020/0337776 A1* | 10/2020 | Saun | .................... | F16M 11/123 |

\* cited by examiner

AUTONOMOUS POSITIONING SYSTEM FOR IN INTERCHANGEABLE CAMERA DEVICES

RELATED APPLICATION

This application claims priority to U.S. Provisional Patent Application 62/913,333 filed on Oct. 10, 2019, entitled "Autonomous Positioning System for Interchangeable Camera Devices", the entirety of which is incorporated herein.

BACKGROUND OF THE INVENTION

Field of the Invention

The present invention relates generally to electronic device stands and holders such as those placed in the home to prop up an electronic device such as a mobile smart phone, tablet, digital camera, video camera or smart electronic assistant with video and camera capabilities. This invention relates specifically to individuals or users who use stands or props to orient the devices camera while video conferencing, taking pictures on a timer or video recording with hands free operation.

Description of the Related Art

The current approach for recording a user with a recording device or camera where the user moves is either by: (1) placing the recording device on a stationary object such as a table or tripod; or (2) to have a second person hold the camera with their hands and point it at the subject. When the camera is placed on a stationary stand and propped up with another object or kickstand the camera does not follow the subject. If the subject moves out of the camera frame, they will no longer be seen by the video conferencing peers.

Having a person hold the phone and follow the subject limits the use of a user self-recording as it requires the use of a secondary person during a video conference or recording session. Having to manually follow the subject causes the user or the secondary person to focus on the recording and not the presentation, let alone having one's hand, arm or shoulder to get tired. The user or secondary person must continuously point the mobile device or camera at the subject, and if the user or secondary person fails or forgets to move the mobile device the subject will no longer be visible in the frame. Further, the instability of the recording will be impacted as the persons hand movements are inherent.

There are several known tracking devices which attempt to capture a moving speaker or group. However, these known tracking devices require the device or camera to install tracking applications which require the use of a specific app or video conference service in order to track a user. Specifically, the tracking application on the camera device must be active which impacts the ability to have a video conferencing app active. In such instances, current tracking devices have combined the tracking app with a video conferencing application. However, this limits the user's ability to choose a conference app which might be more accepted by everyone on the conference. Another category of tracking devices require the use of a dongle that must be worn by the user with the tracking device tracking the dongle and not the movement of the user. The dongle-based devices are problematic as it requires the dongle which might be lost, broken, out of power, or provide poor communication to the tracking device limiting the ability of the tracking device to accurately follow the speaker.

There are known stands that a user can dock a camera or mobile device with pan and tilt features, but they require the user to manually pan and tilt to follow the subject. Further, some stands exist that allow the user to pan and tilt using a remote control. The remote control is typically a separate physical remote or app on a mobile device.

There are integrated pan and tilt cameras. While these cameras can track a user or be controlled through a remote, they don't provide the convenience and functionality of smartphones, tablets, smart assistants or dedicated cameras. Integrated pan and tilt cameras often have their own displays, storage and dedicated apps for connecting to the device through a smartphone or tablet. Since the camera is integrated, the end user is stuck with resolution, ISO, frames per second and other specifications of the integrated camera. Therefore, the video recording, editing and video sharing experience is determined by the device manufacturer which limits consumer choice of best of breed editing apps and selection of camera sensor best for the application. If video conferencing is possible, the manufacturer must integrate a specific video conferencing app with the device. This requires the video conferencing service provider enable third party developer access. Some widely used video conference services do not enable third party access. Or the camera must be plugged into a computer or laptop and used as a web cam. This once again limits end user choice. Some enterprise video conferencing equipment supports standards based interfaces but once again this requires the video conferencing service provider to enable standards base access. Additionally, this equipment typically requires highly trained Information Technology (IT) professionals to setup and maintain. Integrated pan and tilt video cameras tie the end video recording end user to a specific workflow, limit the choice camera sensors for the application and limit the choice of video conferencing service used.

There are devices and video conference services that perform auto-framing. As the user moves, the device manipulates that video stream to zoom in on the location of the user within the frame. These devices require wide angle lenses. Video conference services that perform auto-framing limit the users range of motion because they rely on the existing camera on a camera device such as a laptop. These typically do not have wide field of view. A hardware device with auto-framing typically embeds a single camera with a wide field of view. The users range of motion is limited to a maximum of 180 degrees for a single front facing camera on an auto-framing hardware device. Therefore, the user's range of motion is limited to the field of view of the camera. Additionally, as the user moves to the periphery, the screen on the auto-framing hardware device is stationary. The local user will have difficulty seeing the screen at a very wide angle.

There are also hardware devices with pan functionality with their own screens that provide video conference services and allow apps to be installed. These devices do not have the range of motion issues that auto-framing services and hardware devices have, but are often limited by the choice of video conference services available on that specific device. Additionally, these devices can be large and bulky, taking up significant table space and are not convenient to move to a new location. Some of these hardware devices do not tilt up and down automatically. Such a device makes a recording or video conferencing with kids as the local users, a key use case for casual video conference users, difficult. If the device is on a counter or tabletop, it will need to be manually tilted downward. This highly limits convenience of the hardware device. Since these hardware devices are bulky, they cannot be easily taken while traveling.

Finally, these hardware devices may bring up privacy concerns for the user by gathering data on the user's habits and/or having an always on microphone and camera in the home where private activities and conversations often occur. In enterprise cases, such a device may need approval by a centralized security and/or procurement teams. Further limiting the convenience of the device.

Therefore, what is needed is a standalone device which can track a user or speaker who is moving yet does not require the camera to install a secondary application, does not require use of a dongle, does not require manual interaction directly or through a remote, allows the end user to select the camera device or apps used and does not compromise a user's real or perceived privacy.

SUMMARY OF THE INVENTION

This summary of the invention is provided to introduce concepts in a simplified form that are further described in the detailed description of the invention. This summary is not intended to identify key or essential inventive concepts of the claimed subject.

The present invention provides a positioning system that autonomously and continuously positions one or more camera devices, such as a smartphone, tablet, digital camera, video camera, action camera, webcam, laptop with webcam or smart assistant with an embedded camera towards the direction of the subject using movement tracking technology and motor control. The present invention or Movement Tracking Device Stand ("MTDS") allows the user to insert any camera device that fits into the device clamps. For instance, a smartphone sized version of the MTDS would allow smartphones of various sizes to be held by the device clamps. This enables an interchangeable system that allows users to attach a smartphone that fits within the device clamps. Other embodiments would hold various size tablets, digital cameras, video cameras, action cams, webcams, laptops or smart assistants. This invention allows the camera device to leverage the native functionality of that device without modification while autonomously and continuously orienting the camera device toward the subject.

The MTDS is configured to attach and align a camera device to the stand where the stand tracks the movements of the user during any video conference, photography or videography session. The present invention provides a movement tracking device stand that is activated by a button/switch, by the user securely docking the device on the stand or through voice control. On the device, the user opens their preferred video conferencing (such as Facetime, Zoom, or What's App, etc.), camera or videography app. A camera or sensor on the stand (the "Stand-Sensor" which is separate from the camera on the camera device used for the video conference) sends the sensor data stream to a microcontroller in the stand and a Machine Learning (ML) co-processor performs an object detection process such as detecting the user's face, the presence of a person or a color blob. As the speaker or subject (user) moves, the stand tracks their movements using the stand camera and/or sensors and directs motors in the stand to move the stand or parts of the stand in a manner to orient the camera device at the subject (user). Through movement of the Camera Device Holder assembly (the part of the MTDS that securely holds the camera device), the speaker or user is continually positioned to the designated position in the camera frame during the video conference, photography session or during the video recording. No data connections (i.e. USB, Lightening or Bluetooth connections) are required to operate the MTDS. Additionally, software integrations through APIs or a custom mobile app are not required to operate the device stand.

Current tracking applications require the use of a specific app or video conference service in order to track a user. The MTDS does not require the use of a specific app or video conference service. Nor does it need to connect with any camera or video conference apps through a physical or wireless connection (i.e. Bluetooth, USB, Lightening connections, etc.) or through a software connection (i.e. app or platform specific APIs). The novel stand works with any current and future camera/video app or video conferencing service. Since the stand only holds, pans and tilts the camera device the user is free to use any camera/video recording app, video conferencing service or select a camera with the appropriate sensor for the application. The novel stand allows freedom of movement by the user while using their preferred camera/video recording app or video conferencing service.

The novel stand performs an object detection process locally on the stand using the MTDS Sensor and either a central processing unit (CPU), microcontroller or machine learning/artificial intelligence co-processor connected to the CPU or microcontroller. The novel stand also provides machine learning locally which negates the need for the novel stand to need an internet connection. Since the novel stand does not need to be connected to the internet, the stand provides security advantages since it is unlikely to be remotely accessed or hacked by a non-permissioned actor. Additionally, the novel MTDS provides privacy advantages. Since there is no internet connection, pictures and/or video of the subject cannot be collected and sent to a remote server for analytics purposes.

The present invention provides an autonomous positioning device, for keeping a camera device automatically positioned in the direction of a user, the autonomous positioning device comprising: a base housing, wherein the base housing that provides contact points on the bottom to a horizontal surface, structurally supports the components above and provides mechanical stability; a vertical stem housing portion extending vertically upward from the base housing and attached to the base housing through the opening, wherein the vertical stem housing or some portion of the vertical stem housing is rotatable relative to the base housing; an extension arm housing having a first end connected to a top portion of the vertical stem housing, wherein the first end of the extension arm housing pivots relative to the top portion of the vertical stem housing; a device holder attached to a second end of the extension arm housing; a device holder attached to a second end of the extension arm housing; wherein the device holder having a first clamp and a second clamp, wherein a the first clamp and the second clamp move to hold the camera device in the device holder; a sensor integrated to a top end of the device holder; an x-axis motor which is in a geared connection to the vertical stem housing and rotates the vertical stem housing; a y-axis motor which is in a geared connection to the extension arm housing and moves the extension arm housing relative to the vertical stem housing; a motor controller unit which controls the x-axis motor and the y-axis motor; a processor and machine readable instructions on a tangibly embodied memory within the autonomous positioning device; the processor performing processing based on the machine readable instructions including: (i) receive a plurality of sensor data from the sensor; (ii) determine a new x-axis position and a new y-axis position based on the plurality of sensor data; and (iii) communicate the new x-axis position and the new y-axis position information to the motor controller unit; and the motor controller unit controlling the x-axis motor to move to the new x-axis motor position and the y-axis motor to move to the new y-axis motor position.

The present invention further provides an autonomous positioning device having a machine learning module which receives sensor frame data from the sensor, creates at least one bounding box around at least one object determined from the sensor data, and provides a set of bounding box position data from the at least one bounding box to the processor; wherein the processor determines the new x-axis position and the y-axis position including using a bounding box module which determines an appropriate margin from an upper portion of a sensor frame from the sensor based on the set of bounding box position data. The autonomous positioning device may also determine the new x-axis position and the y-axis position by suppressing periphery movement data or suppressing false positive data. The autonomous positioning device of the present invention may also comprise a jitter control module, managed by the processor, which smooths motor movement of the x-axis motor and the y-axis motor to move to the new x-axis position and the new y-axis position. The jitter control module may be implemented as a PID controller or an electronic speed controller which may be a separate unit or implemented as software or firmware.

The present invention further provides an autonomous positioning device comprising: a base housing, wherein the base housing has a lid and the lid has an opening; a vertical stem housing portion extending vertically upward from the base housing and attached to the base housing through the opening, wherein the vertical stem housing is rotatable relative to the base housing; an extension arm housing having a first end connected to a top portion of the vertical stem housing, wherein the first end of the extension arm housing pivots relative to the top portion of the vertical stem housing; a device holder attached to a second end of the extension arm housing; the device holder having a base ledge, a first clamp and a second clamp, wherein a camera device is rested on the base ledge and the first clamp and the second clamp move to hold the camera device in the device holder; a sensor integrated to a top end of the device holder; an x-axis motor located in the base housing which is in a geared connection to the vertical stem housing and rotates the vertical stem housing; a y-axis motor located in the vertical stem housing which is in a geared connection to the extension arm housing and moves the extension arm housing relative to the vertical stem housing; a motor controller unit which controls the x-axis motor and the y-axis motor; a processor and machine readable instructions on a tangibly embodied memory within the autonomous positioning device; the processor including a machine learning module which receives sensor frame data from the sensor, creates at least one bounding box around at least one object determined from the sensor data, and provides a set of bounding box position data from the at least one bounding box to the processor; the processor performing processing based on the machine readable instructions including: (i) receive a plurality of sensor data from the sensor; (ii) receive the set of bounding box position data; (iii) determine a new x-axis position and a new y-axis position based on the plurality of sensor data; wherein the processor suppresses periphery movement data; wherein the processor suppresses still image data; a jitter control module, managed by the processor which controls motor speed of the x-axis motor and the y-axis motor to move to the new x-axis position and the new y-axis position; a bounding box margin module, managed by the processor, which determines an appropriate margin from an upper portion the top sensor frame based on the set of bounding box position data; and communicate the new x-axis position and the new y-axis position information to the motor controller unit; and the motor controller unit controlling the x-axis motor to move to the new x-axis motor position and the y-axis motor to move to the new y-axis motor position. The autonomous positioning device may further include the processor integrating an out of frame search logic which determines movements of the x-axis motor and the y-axis motor until a new object is detected by the sensor. The jitter control module may be implemented as a PID controller or an electronic speed controller which may be a separate unit or implemented as software or firmware.

The autonomous positioning device may further comprise a microphone array integrated into autonomous positioning device. The autonomous positioning device may include an audio module, managed by the processor, which determines audio location from the microphone array and adjusts the determined new x-axis position and new y-axis position based on the audio location. The autonomous positioning device may include a subject position module, managed by the processor, which determines whether to focus on a torso or a face of a user based on location and movement of the user from the sensor data. The autonomous positioning device may also be implemented where position feedback module provides the x-axis motor position data and y-axis position data to the processor for use by the processor in determining a second new x-axis motor position and a second new y-axis motor position (i.e. adjusting the updated position from the last known position).

The present invention also provides a novel autonomous positioning device comprising: a stationary base; a rotatable x-axis assembly; a moveable y axis assembly; a device holder connected to the y-axis assembly; a sensor integrated into the device holder; an x-axis motor for moving the x-axis assembly; a y-axis assembly for moving the y-axis assembly; a motor controller unit which controls the x-axis motor and the y-axis motor; a processor and machine readable instructions on a tangibly embodied memory within the autonomous positioning device; the processor including a machine learning module which receives sensor frame data from the sensor, creates at least one bounding box around at least one object determined from the sensor data, and provides a set of bounding box position data from the at least one bounding box to the processor; the processor performing processing based on the machine readable instructions including: (i) receive a plurality of sensor data from the sensor; (ii) receive the set of bounding box position data; (iii) determine a new x-axis position and a new y-axis position based on the plurality of sensor data; wherein the processor suppresses periphery movement data; wherein the processor suppresses false positive data; a jitter control module, managed by the processor which determines motor speed of the x-axis motor and the y-axis motor to move to the new x-axis position and the new y-axis position; a bounding box margin module, managed by the processor, which determines an appropriate margin from an upper portion the top sensor frame based on the set of bounding box position data; and communicate the new x-axis position and the new y-axis position information to the motor controller unit; the motor controller unit controlling the x-axis motor to move to the new x-axis motor position and the y-axis motor to move to the new y-axis motor position. The jitter control module may be implemented as a PID controller or an electronic speed controller which may be a separate unit or implemented as software or firmware. The autonomous positioning device may include a subject position module, managed by the processor, which determines whether to focus on a torso or a face of a user based on location and movement of the user from the sensor data. The autonomous positioning device may also be configured to allow the x-axis motor to rotate in a continuous rotation beyond 360 degrees.

These and other objects, features, and/or advantages may accrue from various aspects of embodiments of the present invention, as described in more detail below.

DETAILED DESCRIPTION OF THE INVENTION

Particular embodiments of the present invention will now be described in greater detail with reference to the figures. As used herein, any term in the singular may be interpreted to be in the plural, and alternatively, any term in the plural may be interpreted to be in the singular. It is also appreciated that a feature of one embodiment of the invention as described herein may be used in conjunction with one or more other embodiments as may be desired.

Figure 1A:
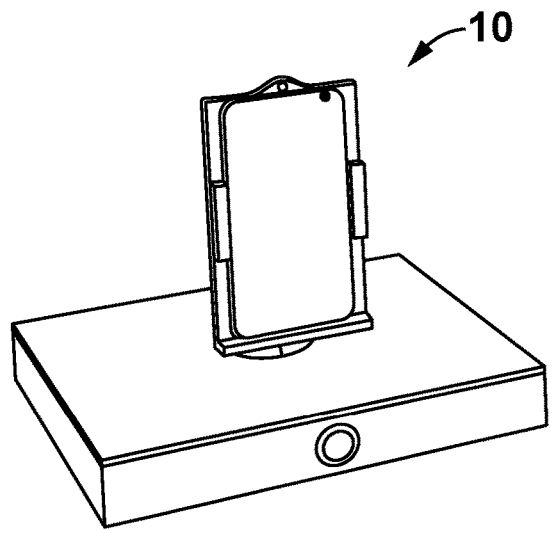
FIG. 1A shows a perspective view of the present invention with a smartphone.
Figure 1B:
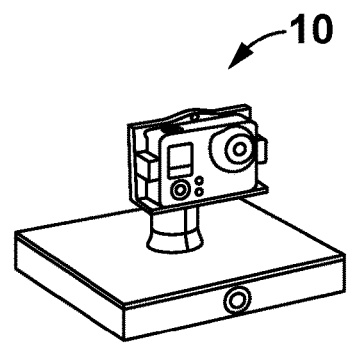
FIG. 1B shows a perspective view of the present invention with an action camera.
Figure 1C:
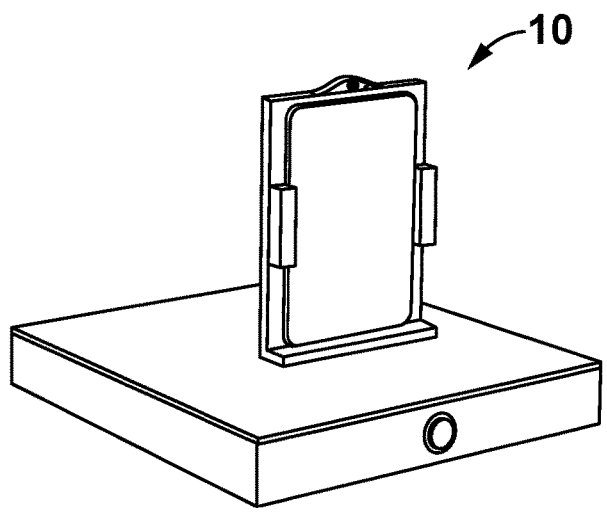
FIG. 1C shows a perspective view of the present invention with a tablet.
Figure 1D:
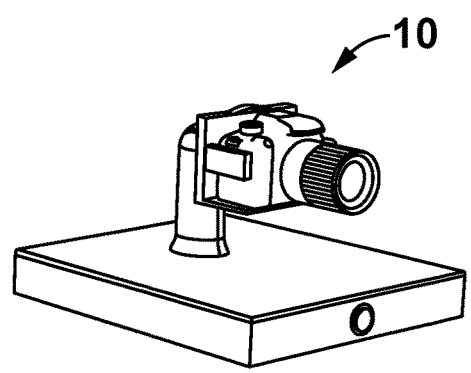
FIG. 1D shows a perspective view of the present invention with a DSLR camera.

As seen in FIGS. 1A-1D the present invention provides several variant embodiments of the autonomous positioning device, also referred to as the movement tracking device stand 10 or MTDS including for use with a smartphone (FIG. 1A), an action camera (FIG. 1B), tablet (FIG. 1C), Digital Single Lens Reflex (DSLR) camera (FIG. 1D). The MTDS 10 may be designed with one platform or base with different device holding configurations or may be sized and shaped differently for each camera device.

FIGS. 2-5 show an exemplary embodiment of the MTDS 10 that manages and controls the location of or direction of a smartphone 90. The smartphone embodiment of the MTDS 10 will be used to illustrate the MTDS's functions and novelty moving forward. In this embodiment the camera device is the smartphone.

Figure 2:
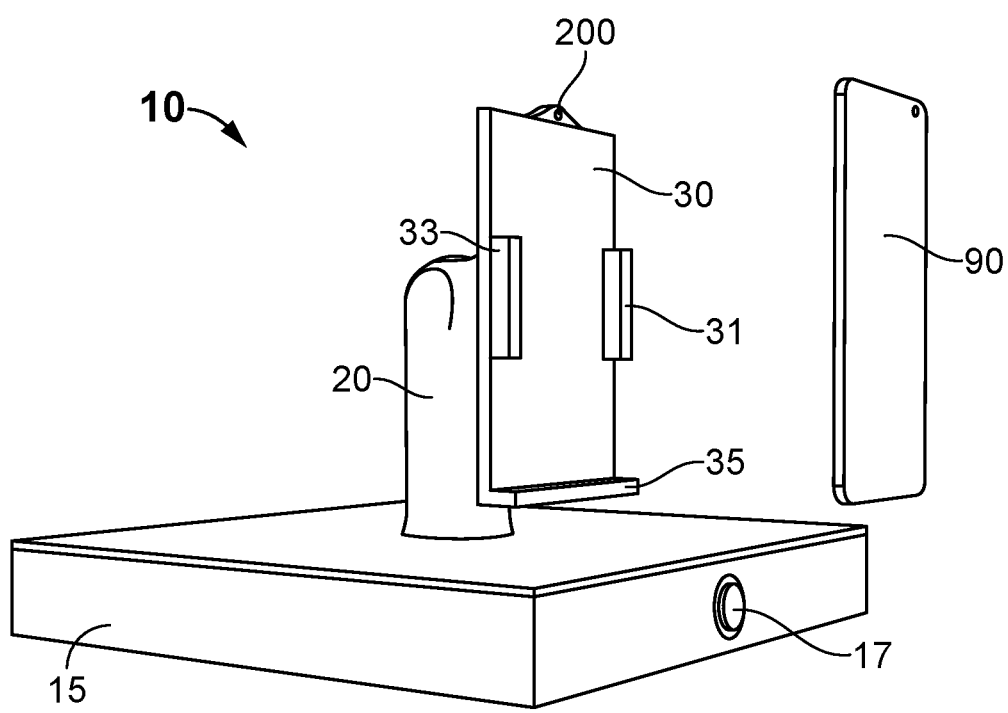
FIG. 2 provides a perspective view of the present invention with a smartphone detached from the holder.
Figure 3:
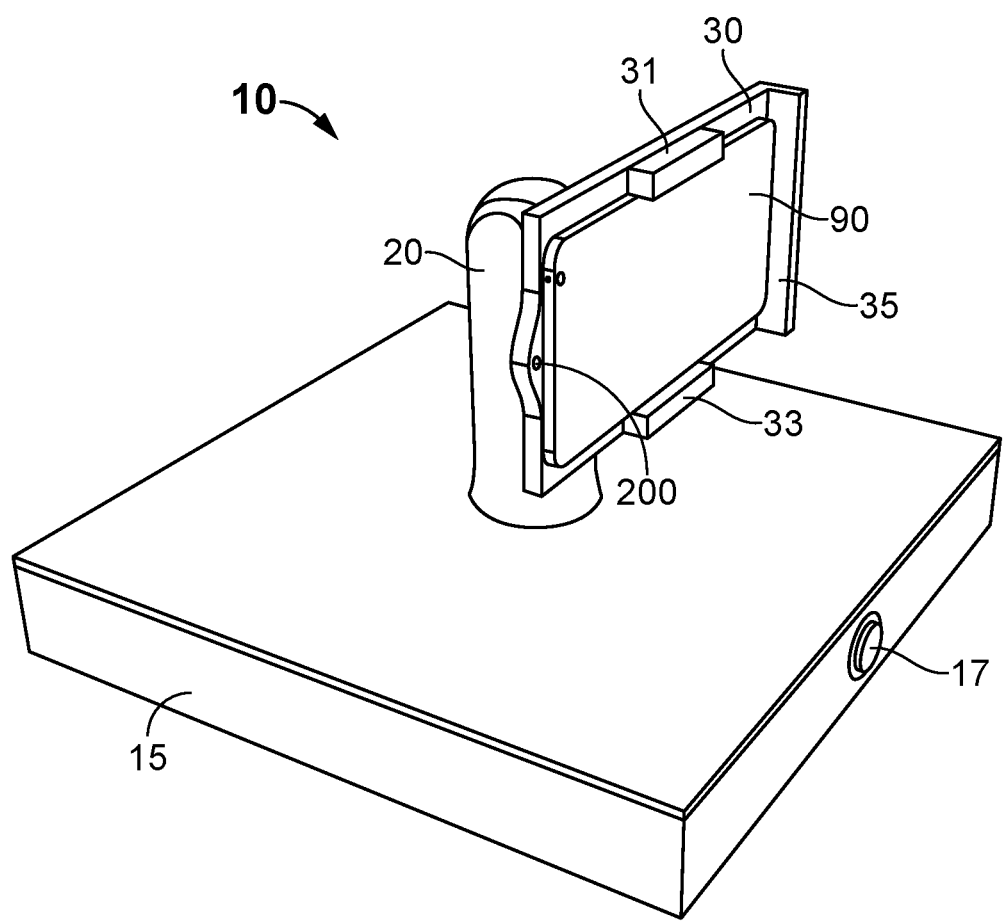
FIG. 3 provides a perspective view of the present invention with a smartphone attached to the holder with the holder in a rotated position.
Figure 4:
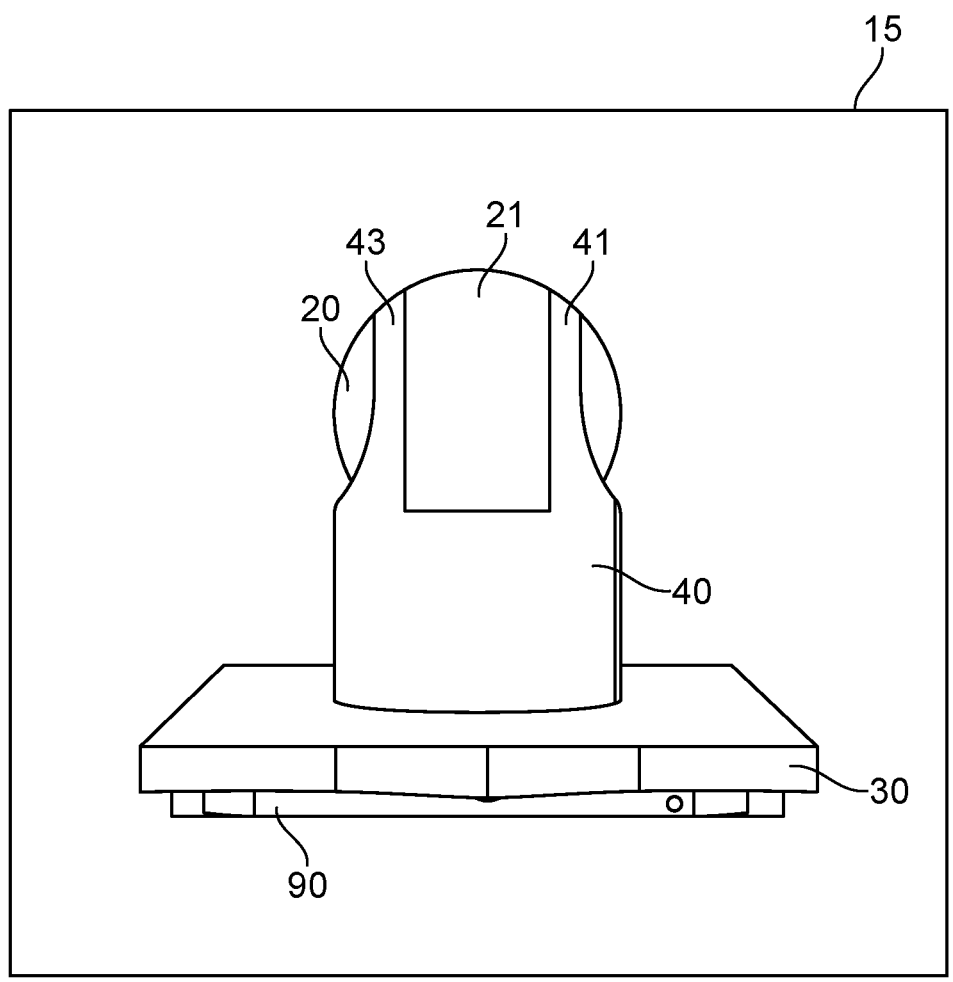
FIG. 4 provides a top view of the novel stand of the present invention where the user provided smart device is docked in the holder of the movement tracking device stand.

FIG. 2 shows a view of the MTDS 10 where a camera device is undocked. FIG. 3 shows a view of the MTDS 10 where the camera device is docked and where the camera device holder 30 and camera device 90 can be rotated from portrait view to landscape view, either 90 degrees to the left or 90 degrees to the right. As seen in FIGS. 2 and 4 the MTDS 10 includes a device stand base 15, an activation button 17, a camera device holder 30, The camera device ledge 35, first or tight camera device holder clamp 31, second or left camera device holder clamp 33, a device stand sensor 200, an x-axis rotation support (stem or arm) housing 20, and a y-axis support (stem or arm) housing 40.

The base 15 provides a solid platform for the MTDS 10. The base 15 also encases the electronics of the MTDS 10 and supports the weight of all the components above the base 15.

The camera device holder 30 is connected to the y-axis rotation support housing 40. This support 40 is pivotally connected to the x-axis support housing 20. The x-axis rotation support housing 20 is connected to the base 15 in a mechanical configuration allowing the x-axis rotation support housing 20 to rotate.

Figure 7A:
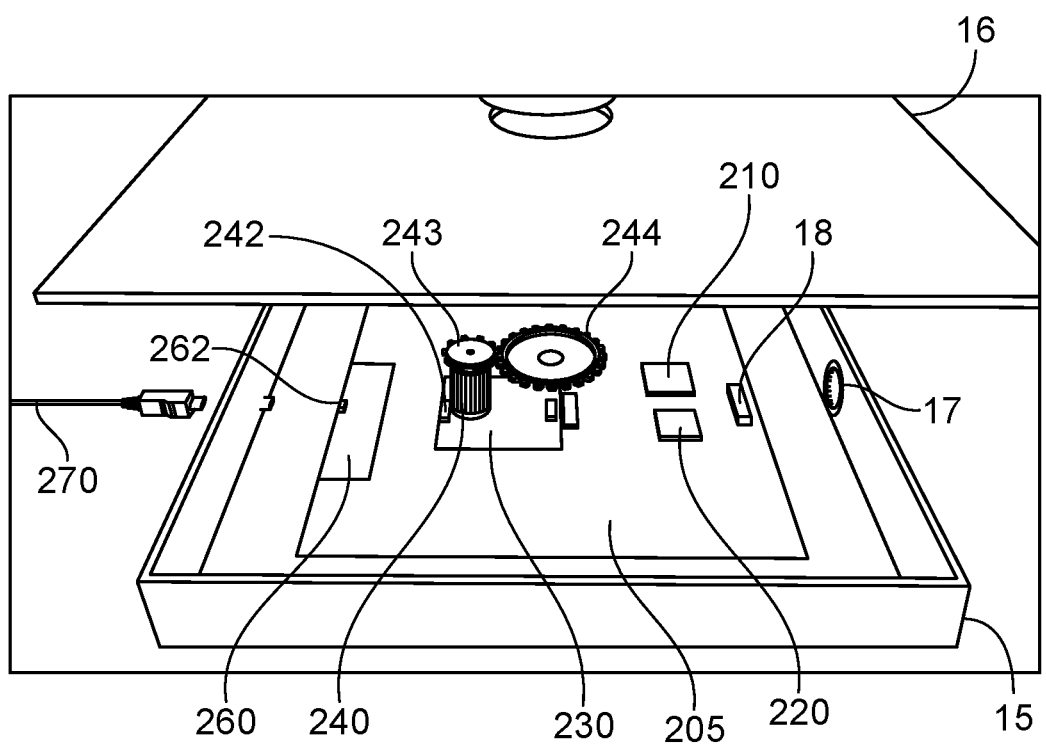
FIG. 7A provides an exploded view of the of the processing and power elements contained within the lower housing of the movement tracking mobile stand.

The device stand base 15 houses the printed circuit board with mounted electronics components and cable connectors, cabling and x-axis motor 240 and x-axis gear train (see FIG. 7A). The x-axis gear train consists of the x-axis motor shaft 241, x-axis drive gear 243 and the x-axis rotation gear 244. The device stand base houses the x-axis motor's shaft which connects to the x-axis gear train which in turn will connect to the x-axis rotation support 20. When the x-axis motor's shaft turns this will turn the gear train causing the x-axis rotation support housing 20 to rotate horizontally either left to right or right to left so that the camera device 90 is oriented toward the user. This rotation is also called panning.

As seen in FIG. 4, the y-axis rotation support or arm 40 includes two flanges 41, 43 on each side. Each flange 41, 43 fits into openings 28, 29 (see FIG. 5) within the upper portion of the x-axis rotation support 20. The y-axis motor shaft 62 connects to the y-axis gear train inside the x-axis rotation support 20. The y-axis gear train will connect to the y-axis rotation support 40. As the motor shaft 62 turns, this will cause the y-axis rotation support 40 to move up and down so that the camera device 90 is oriented toward the user as they move up, down closer or farther away from the camera device 90. This rotation is also called tilting.

Figure 5:
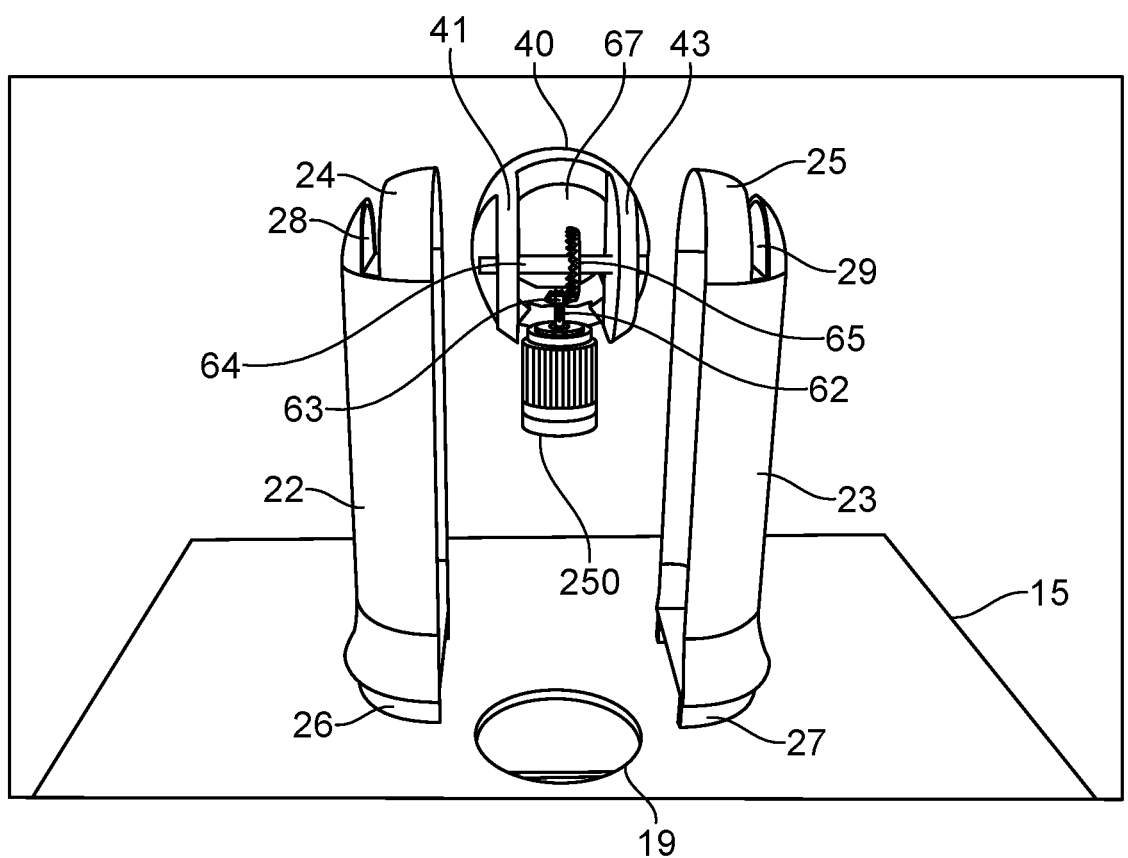
FIG. 5 provides an exploded view of the vertical assembly of the present invention.

As seen in FIG. 5, inside the x-axis support housing 20 is the y-axis motor 250 and gear train. The y-axis gear train includes a y-axis motor shaft 62, a y-axis drive gear 63, a y-axis rotation gear 65 and a y-axis rotation shaft 64. The y-axis drive gear 63 is at the end of the y-axis motor shaft 62 and rotates as the motor is activated. The y-axis drive gear 63 mates with the y-axis rotation gear 65 causing the y-axis rotation gear 65 to rotate as the y-axis drive gear 63 moves. This bevel gear design allows the y-axis motor 250 to be oriented at a 90-degree angle from the direction of rotation. This allows the motor to be oriented vertically. The y-axis rotation gear 65 is fixed to the y-axis rotation shaft 64 causing the shaft to rotate which causes the y-axis rotation support 40 to move.

The x-axis support housing 20 may be configured as a clam shell design having a right half 22 and a left half 23. At the top of housing 20 are the two slots 28, 29 which mate with the y-axis support flanges 41, 43. The housing 20 also has an inner top portion 24, 25 on each half 22, 23. When connected, the inner top portions 24, 25 mate together to create a joined knuckle which covers the y-axis motor 250 and y-axis rotation shaft 64 and fits within the space between the y-axis support arm flanges 41, 43. The x-axis rotation support 20 also includes flared ends 26, 27 on the lower portion of the housing pieces 22, 23. The flared ends have a wider portion for resting on the lower device stand cover 16 of the lower housing 15. The flared ends 26, 27 also have a recessed portion which fits within a receiving hole 19 on the device stand base 15.

Figure 6:
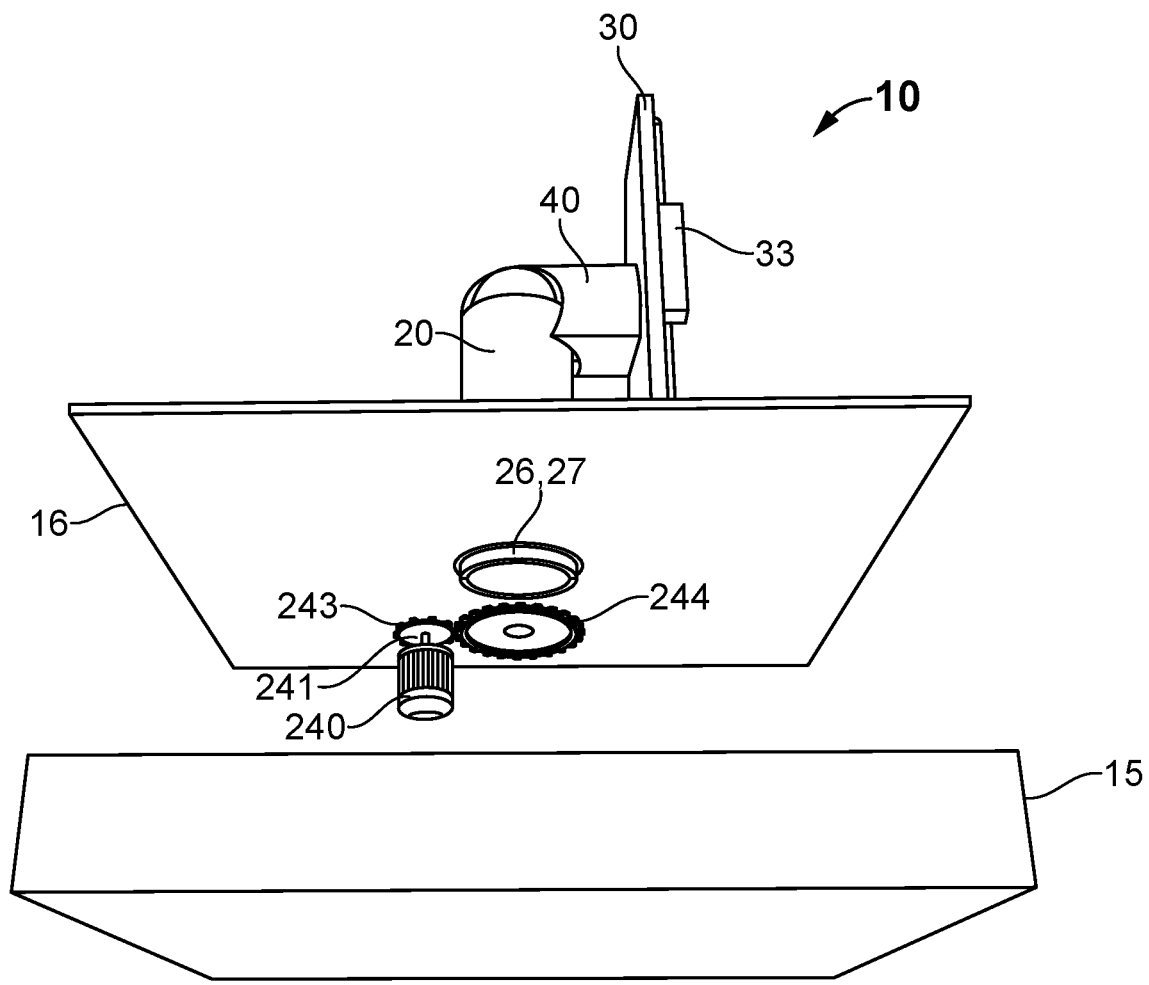
FIG. 6 provides an exploded view of the of the gearing elements contained within the lower housing and mating elements for the vertical assembly of the present invention.

As seen in FIG. 6, the lower portion of the ends 26, 27 protrude through the hole 17 of the cover 16. When the two halves 22, 23 of the x-axis housing 20 are joined they form a cylindrical shape. At the bottom of the x-axis housing 20 there is a protrusion 246 which extends below the ends 26, 27. The protrusion mates with the gearing assembly of the x-axis motor 240. The x-axis rotation gear 244 is connected to the x-axis rotation support 20 such that when x-axis rotation gear 244 rotates the x-axis rotation support rotates. The x-axis rotation gear 244 mates with the x-axis drive gear 243 which is driven by the x-axis motor 240.

As seen in FIG. 7A, the device stand base 15 contains the various electronics and processing elements of the MTDS 10 as well as the x-axis motor 240, x-axis drive gear 243 and x-axis rotation gear 244. The x-axis motor 240 is connected to the x-axis motor connector block 242 and a motor control subsystem 230 which resides on a printed circuit board (PCB) 205. The MCU 210 and ML co-processor 220 (also reside on the PCB 205). The activation switch 17 engages the activation button connector block 18 which is connected to the power supply 260 to provide power to the MTDS 10. The power supply 260 is connected to the power supply connector block 262 which is connected to a power adapter 270 which can be connected to an AC power outlet (for the AC powered version). As previous described, a rechargeable battery could be included for providing cordless operation.

The MTDS uses a real-time closed feedback loop algorithm to correctly position the stand's sensor, and thereby the device's camera, at the user as they move in front of the device. The objective of this closed loop algorithm is to keep the user at a designated position in the device stand's sensor and device camera's frames, respectively. For instance, for cinematic applications which use the rule of thirds, a user could be placed at the right hand third line of the frame. For video conference applications the user could be centered.

The device may include a single button to start and stop movement tracking. When this button is pressed by the user, the software or firmware is loaded from non-volatile storage into Random Access Memory (RAM) or volatile storage for execution on the MCU. This software executes a command for the sensor to begin operation. If the sensor is a camera, it detects the light from the scene and then encodes it into a data structure as a digital representation of the scene. This data structure is passed to the microcontroller 210 along a cable and/or data bus embedded in the PCB 205. The microcontroller 210 will then run a software algorithm to detect the presence of an object such as a person or a face. Though the detection is not limited to people or faces. In one possible embodiment, the software uses a pre-trained artificial intelligence model. This model is loaded into memory of the stand. When the data structure representing the image arrives from the device's camera, that information is sent through the artificial intelligence model in memory. This process is often computationally expensive; therefore, an ML co-processor 220 may be used ensure the image data is processed quickly in one possible embodiment. The ML Co-Processor can also be referred to as an Artificial Intelligence (AI) Accelerator or a Neural Processing Unit (NPU). The model then outputs the location of the object within the camera frame and a label describing the object. Next, software on the microcontroller calculates how far off from the designated position of the sensor's frame the device is. Based on this offset, software calculates the angle the x and y axis motors need to move so that the user can be centered in the camera frame. This angle is then sent to the x and y axis motors. In one embodiment, the angle is sent using a Pulse Width Modulation (PWM) signal. Software translates the angle into a correct PWM pulse width and then sends it across a cable, wire or bus. In other embodiments the motors receive the information through other means such as a two-wire serial connection or an $I^2C$ bus connection. In one embodiment, the device stand includes a position sensor to feedback the exact position of the motors to the microcontroller. This feedback ensures that the position of the motors is known by the algorithms when needed. This position data can be used to know the precise time that the motor has come to the target position.

Camera device holder's 30 front provides a flat surface for the back of the camera device to rest on. The entire camera device holder 30 rotates to allow the camera device to be rotated into either landscape or portrait mode. The left and right camera device holder clips 31, 33 hold the camera device 90 against the camera device holder's front surface 30 to keep it from falling off or moving during operation. In alternative embodiments, the device holder clip can secure the camera device to the device stand using several methods including:

a. A spring based clamping mechanism where the user separates the clamps with one or both hands, slides the device into the clamp then releases the clamp which then closes onto the sides of the device holding it in place. These clamps may have a soft material such as rubber or a gel to prevent scratches and damaging the device. Additionally, the clamp and or release mechanism could be a button or a switch.

b. A magnet which is attached or embedded in the camera device backing 30 magnetically connects to a magnetically attracted material, such as metal, on or in the mobile devices case.

c. Ledges on the device clips jut out from the clips 33, 31 and come across the front of the camera device enough to keep the camera device in place during movement, though without covering the camera device's screen, front facing camera or sensors as not to hinder the native operation of the smartphone.

In one possible embodiment, notches and grooves in the camera device holder can be used to accommodate protrusions from a smartphone case. For instance, if a smartphone has a case which includes a kickstand that protrudes farther out than the backing of the case, the camera device holder 30 will have a notch at a common location for many smartphone cases with kickstands. Or in another possible embodiment, if a user has an extendible stand/two finger grip, often called a Pop Socket, the camera device holder 30 could include a groove at common locations for these.

The MTDS stand sensor 200 sits atop the swiveling assembly and provides a sensor data stream of the area in front of the MTDS 10. This sensor data stream is passed to the MCU 210 and then to the ML co-processor 220 in FIG. 7A/B which performs object detection. In one possible embodiment, the sensor includes processing elements so that the entire object detection process resides within a single sub-system. The MTDS provides an attachment point and a stable foundation for the swiveling portion of the apparatus. When the camera device 90 is securely docked to the stand, the device's camera points in the same direction as the MTDS sensor 10. In an alternative embodiment the stand's sensor may be adjusted linearly across the x-axis so that the stand's sensor can be aligned with the device camera's location. Additionally, in an alternative embodiment the stand's sensor or camera device ledge 35 can be adjusted linearly on the z-axis in order to accommodate various phone heights. In another embodiment one or more wide angle lens, with a broad field of view camera can be mounted on the device stand. A typical lens will have a 65 to 70 degree field of view. Whereas a wide-angle lens will have a field of view about 100 degrees or more. A single wide-angle lens could be used to encompass the entire x-axis range of motion. Or multiple wide-angle lens can be combined to create a larger field of view in front of the device stand. Therefore, the stand's sensor would not need to physically move and would be stationary. Software would be used to account for the differences in view between the stand's sensor(s) and the device's camera.

The MTDS 10 continuously and autonomously tracks the movement of the user during a video conference session or camera/video recording without the use of a remote, separate person to control the camera device or a dongle the user must wear. This enables hands free movement tracking within a room. The stand does not require physical/wireless connections or software interfaces to the device in order to function.

Since movement tracking is performed by the MTDS 10, the user can use any app available on the camera device while using the MTDS 10. Since movement tracking is performed locally on the MTDS 10 (rather than in the cloud) no internet connection is required. Without an internet connection the device cannot be remotely hacked. This increases the privacy of the device and decreases a potential user's concerns over the device being used to spy on their home or office. Additionally, since processing is performed locally on the device stand, the stand can respond more quickly to a user's movements. If the detection process were performed in the cloud there would be a significant delay as an image from the sensor data stream is sent to the cloud, processed and a response is sent back to the device. Therefore, keeping the detection process local to the device stand results in a more responsive device and better user experience.

Figure 7B:
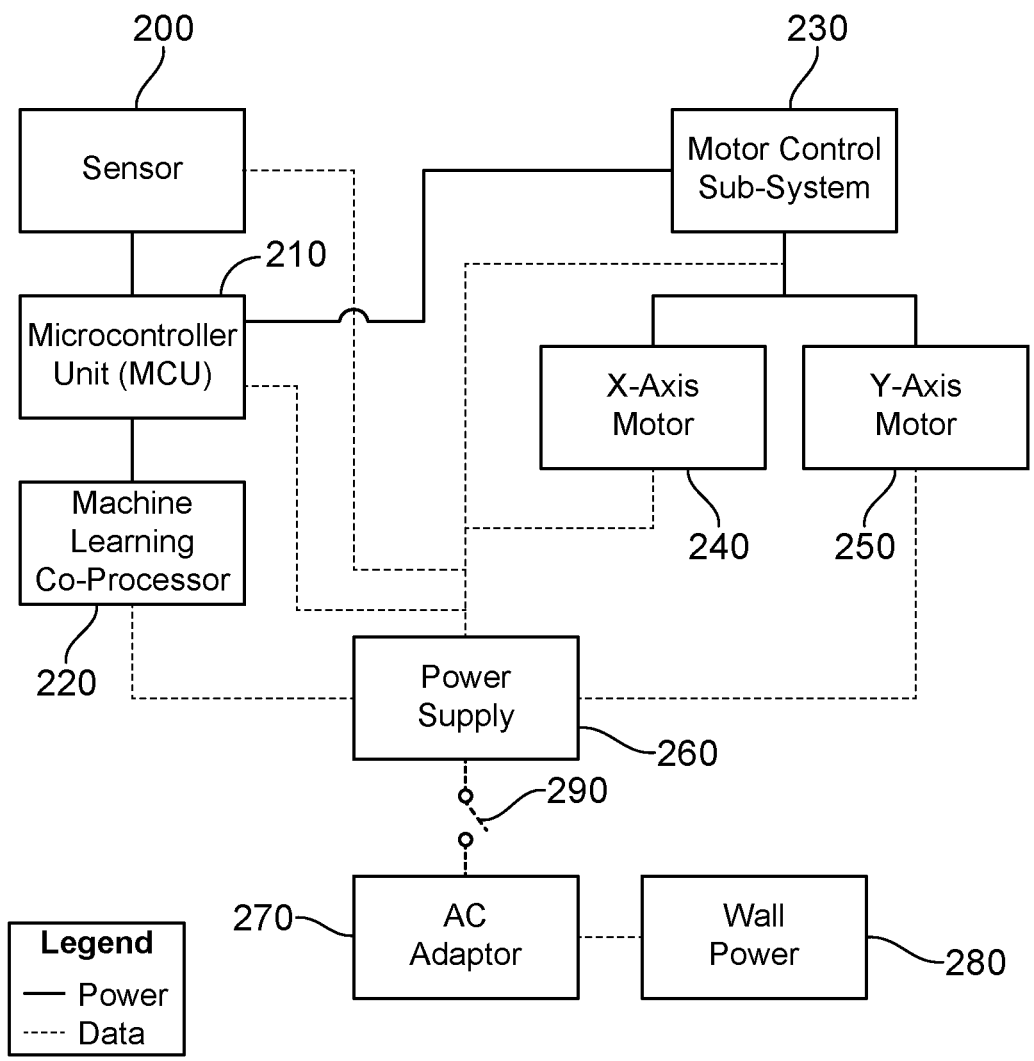
FIG. 7B provides a block diagram of the processing and power elements of the movement tracking mobile stand.

FIG. 7B provides a block diagram illustrating the movement tracking device stand electronic components. The sensor 200 on top of the device swivel apparatus includes a sensor and required electronics that generate an encoded sensor data stream. In one embodiment the stand only uses a camera without any additional sensors. In other possible embodiments, distance sensors could be used as the primary sensor or secondary sensors to provide additional functionality, such as providing the software algorithms a distance metric to help increase accuracy or stopping the stand's swiveling motion if a hand or object comes too close to the stand. The stand may perform automatic focus, exposure, gain, white balance and ISO selection. This functionality may be performed by specialized processing on the stand's camera or in the MCU. The MCU 210 receives the sensor data stream and performs object detection leveraging the ML Co-Processor 220 to decrease processing time. The MCU 210 provides the location of the detected object in the sensor's 200 field of view. This information is used to calculate the angles to turn the motors 240, 250 for proper tracking. The MCU 210 will send these values to the motor control subsystem 230. The motor control subsystem 230 will control the X and Y Axis Motors 240, 250 so that they move to the appropriate angles. In an exemplary embodiment, the X-Axis Motor 240 is an electro-mechanical component that pans the camera device 90 and the Y-Axis Motor 250 is a electro-mechanical component that tilts the camera device 90.

Each variant embodiment must be able to accommodate varying sizes and weights of a camera device. For instance, the smartphone embodiment of the MTDS 10 will need to accommodate varying smartphone screen sizes and varying smartphone cases which increase the width, depth and height. Therefore, the MTDS's camera device holder 30 must work with a wide variety of smartphone sizes. The camera device ledge 35 must jut out enough to support larger phones. The camera device clamps 31, 33 must have a minimum distance between them to securely hold smaller smartphones on the market. Additionally, the camera device clamps 31, 33 must be wide enough to accommodate larger smartphones with their cases on. Since, smaller phones weigh less and larger phones weigh more, this will affect the mechanical stability of the MTDS 10. The MTDS 10 must be engineered correctly so that it does not topple over as it moves the smartphone camera device. Further, mechanical stability is needed to ensure the camera device's video is not jittery. Without a stable design, the camera device will jitter back and forth at the end of a movement creating a poor user experience.

The MTDS's 10 motor control sub-system 230 controls the speed of rotation of the x-axis motor 240 and y-axis motor 250. An MTDS 10 without speed control results in a poor user experience. If the motors 240, 250 move too fast, the result will be the camera device holder and camera will have too much momentum when stopping. They will overshoot the target position and then will correct to the position of the subject. This results in jittery and blurry video on the camera device, especially at the beginning and end of a position correction. If the motors 240, 250 move too slow, the video will not be able to keep up with a fast-moving subject. In one possible embodiment, the MTDS 10 determines the angular speed of the x-axis rotation support 20 and the y-axis rotation support 40 based on the distance that needs to be moved. For example, if a user is relatively stationary but still moving slightly with the sensor frame a slower angular velocity may be used. The small movement results in very short distances for the motors 240, 250 to drive the supports. If a fast speed is used, these movements appear jittery to the user because there are many quick movements. Therefore, for smaller user movements a slower angular velocity is used. Though if the user is moving very quickly across the MTDS's range of motion a faster angular velocity is required. Therefore, the MTDS 10 changes its choice of angular velocity or motor speed based on the distance it needs to move to track the user in this embodiment. Jitter control may be implemented by a jitter control module, managed by the MCU, which determines the angular velocity or motor speed of the x-axis motor and the y-axis motor. The jitter control module may be implemented as a PID controller or an electronic speed controller or both.

The camera device holder 30 of the MTDS 10 must be able to be rotated 90 degrees to the left and 90 degrees to the right to form the portrait mode shown in FIG. 3 to accommodate landscape mode video conferencing, video recording and photography. The user can manually rotate their phone, while docked:

a. From portrait mode to landscape mode 90 degrees to the right
b. From portrait mode to landscape mode 90 degrees to the left
c. From landscape mode 90 degrees to the right to portrait mode
d. From landscape mode 90 degrees to the left to portrait mode
e. From landscape mode 90 degrees to the right to landscape mode 90 degrees to the left.
f. From landscape mode 90 degrees to the left to landscape mode 90 degrees to the right This rotatable mechanism provides great flexibility for the user but provides a challenge for the sensor cabling used to connect the sensor 200 to the printed circuit board 205. In one possible embodiment the sensor 200 is mounted onto a small sensor printed circuit board (PCB) that is mounted within the sensor housing at the top of the holder 30. The sensor 200 needs to send its raw data to the MCU 210 for processing. This is typically done over an electrical protocol such as Inter-Integrated Circuit (I²C), Controller Area Network (CAN), Serial Peripheral Interface (SPI), Universal Asynchronous Receiver Transmitter (UART) or Camera Serial Interface (CSI) for camera-based sensors. Each of these protocols require multiple wires to send data to the MCU 210. The sensor's PCB or cabling will breakout these wires through a connector. Since the sensor 200 sits on top of the camera device holder 30, the sensor's cabling will need to be routed through the inside of the camera device holder 30 (which is hollow). This cabling will be routed through one or more holes in the back face of the camera device holder 30 and the front face of the y-axis rotation support bracket 40 which mate with each other. This will cause cable to have a 90 degree turn so that it can be routed through the hole. When the camera device holder 30 is rotated to landscape mode, the cabling in the housing will rotate also. In one possible embodiment, the opening between the camera device holder 30 and the y-axis rotation support 40 is in the shape of a half circle. This half circle is positioned on the upper half of the front face of the y-axis rotation support bracket 40. When the camera device holder assembly 30 is in portrait mode, the cabling will reside at the top of the half circle opening. As the camera device holder 30 rotates, the half circle opening will rotate 90 degrees to the left or right (depending on which direction the user rotates the camera device holder). The cabling will not rotate with the half circle opening but will stay in place. This approach allows the sensor 200 to be mounted close to the camera device's camera but enables the electronics to be mounted inside the device stand base 15. In an alternative embodiment, the electronics could be mounted inside the camera device holder 30 backing. Through cabling for the power (which is connected to the back of the base 15), the x-axis motor 240 and the y-axis motor 250 would need to be routed through an opening in the base 15, through the x-axis housing 20 and the y-axis rotation support 40.

In another alternative embodiment, rather than using an MCU 210 and ML co-processor 220, those components could be implemented in a dedicated Field Programmable Gate Array (FPGA), Application Specific Integrated Circuit (ASIC), a System On a Chip (SOC) or System On Module (SOM). The ML co-processor 220 could be replaced by a Digital Signal Processor (DSP) chip or a Graphics Processing Unit (GPU).

The object detection process works while multiple objects are in the video capture area or screen so several different participants can be present during a video conference or camera/video recording session.

The MTDS's object detection process must be able to recognize relevant desired objects accurately and reject irrelevant objects. In the embodiment that uses person detection, the MTDS's sensor is a camera. The neural network behind the object detection process must be trained with image data that the MTDS's camera is likely to encounter when deployed into the field. For instance, the MTDS's camera will be oriented in landscape mode. This means the image will be captured rotated 90 degrees. Therefore, the neural network must be trained with images that are rotated 90 degrees. Additionally, since the MTDS's camera device holder 30 rotates either 90 degrees to the right or 90 degrees to the left, the neural network must be trained with images with both rotations. The MTDS 10 will not accurately identify objects while rotated. This will lead to a poor user experience. In another embodiment, this problem can be solved with a sensor that can identify when the camera device holder 30 is rotated. When this sensor identifies a rotation, the incoming image can be rotated prior to being processed by the object detection process. In the person detection embodiment, the object detection process will also encounter images of people with different skin color and varying lighting conditions. Since the MTDS 10 could be used in any geographic situation, persons of different ethnicities will use the MTDS 10. Therefore, the MTDS's sensor 200 will capture persons of varying skin color. The MTDS 10 will be used in situations where the user(s) may be backlit, and the scene captured by the sensor 200 may be dark due to insufficient lighting. The public data sets often used to train neural networks are from publicly available photos. These photos often use professional lighting, camera flash and/or are post processed by image editing software to enhance the appearance of the photos. Therefore, the neural network training data set must incorporate scenes that are more representative of the scenes MTDS users will be in. Without incorporating these more representative scenes, the object detection process will miss persons and detect persons when there are none in the scene. Without using data augmentation to make the data set more diverse, the object detection process will be less accurate. This will lead to a more jittery movement tracking, which leads to a poor user experience. In addition to data augmentation, synthetic data may be generated to add to the training data set. Synthetic data is created by artificial intelligence algorithms called Generative Adversarial Networks (GANs). These algorithms are configured to create fake images that are representative of the real-world scenes the MTDS will encounter. Once these images are generated and labeled, they can be incorporated into the training data set. Then the training process is run on this new data and outputs a model that is more capable of handling real-world variations in user scene lighting, user skin tone, movement and positioning.

Person detection algorithms will detect images of people in pictures on the wall. These additional objects will change the combined bounding box size resulting in the user(s) not being at the desired location within the sensor frame. In one possible embodiment, a mechanism to filter out pictures in a room are employed. Neural networks output the location of the object, an identifier of the object (i.e. a person in this case) and a confidence score between 0 and 1. A human in front of an MTDS 10 will have a higher confidence score, but pictures with people in them will have low confidence scores. The MTDS's software, which is loaded into the MTDS's memory when the device is activated and runs on the MCU, can be configured to only output objects with a confidence score above a threshold. This approach rejects false positive detections or suppresses false positive data (i.e. still image data) and helps ensure the user is in the desired location within the frame. Suppressing false positive data may include filtering, limiting, ignoring which may include value determination and a threshold analysis on the data. In another possible embodiment, stereoscopic sensors or cameras may be used. Two stereoscopic sensors would be mounted side by side inside the sensor 200 housing with the sensor portion protruding out of the housing. These two sensors can be used to provide and determine depth information. A real human in front of the MTDS would have depth, while a photograph or picture on the wall would not. This would increase the accuracy of the object detection process.

In an alternative embodiment, object detection process can be implemented inside the MCU 210, assuming the MCU 210 has enough processing power and memory resources rather than the ML co-processor 220. In another alternative embodiment, the object detection process can be implemented in a computer with a central processing unit (CPU), random access memory (RAM) and persistent storage such as solid-state drive (SSD) or memory card with an operating system (OS) running on this computer. Further, servos could be used instead of motors 240, 250.

In one possible embodiment, the object detection process detects additional objects such as a pet (i.e. cats, dogs, etc.), a moving object such as a bicycle or remote-controlled car so that non-human objects may be tracked. In another possible embodiment, the object detection process will stop movement tracking when any object, such as a user's hand, comes within certain distance of the device. The purpose of the proximity detection is to prevent the rotating portion of the stand from making contact with a user in order to avoid an injury or allowing the user to control the camera device using its onboard functionality.

As further seen in FIG. 7B, the power supply 260 provides power and ground signals to electronic and mechanical components. The AC adaptor 270 transforms alternating current (AC) from wall power 280 into direct current (DC) that is usable by the electronics, sensor and motors. Wall power 280 is the source of power in the form of alternating current. Users may flip the on/off switch 290 as this switch provides power to turn on the MTDS 10 or turn off the MTDS 10. In one possible embodiment, the activation button 17 and the power switch 290 are the same. This allows the user to press one button to both turn on the device and activate the movement tracking with one button press. This embodiment requires a fast startup time from when power is applied to the electronics and motors since the user will expect the device to begin movement tracking as soon as the Activation button is pressed.

In one possible embodiment, the MTDS 10 provides a wired charger to charge battery operated devices such as a smartphone or tablet while the device 90 is attached to the stand. The user can connect the charging cable to the device after the device is securely held by the device clamps. This charging cable may have interchangeable tips or adaptors such as a Lightening, USB-C, micro-USB, mini-USB or barrel connector. For mobile devices with wireless charging capabilities (such as Qi based chargers), the stand can include a Qi charger in the device backing to perform inductive charging without the need for a cable. Or in another possible embodiment, the camera device ledge can include a notch to allow a charging cable through into the phone's charging port. Continuously using the camera functionality on a battery-operated device consumes significant power on the device. The wired and wireless chargers mitigate this problem and allow users to operate their mobile device on the stand for longer periods of time.

In an exemplary embodiment, the MTDS 10 has an internal rechargeable battery. This battery is used to power the MTDS's 10 internal components and could be used to charge the camera device 90 through a physical power connection (i.e. lightening, USB, etc.) or using a wireless charging mechanism such as inductive charging. This makes the MTDS 10 portable to any location.

Figure 8:
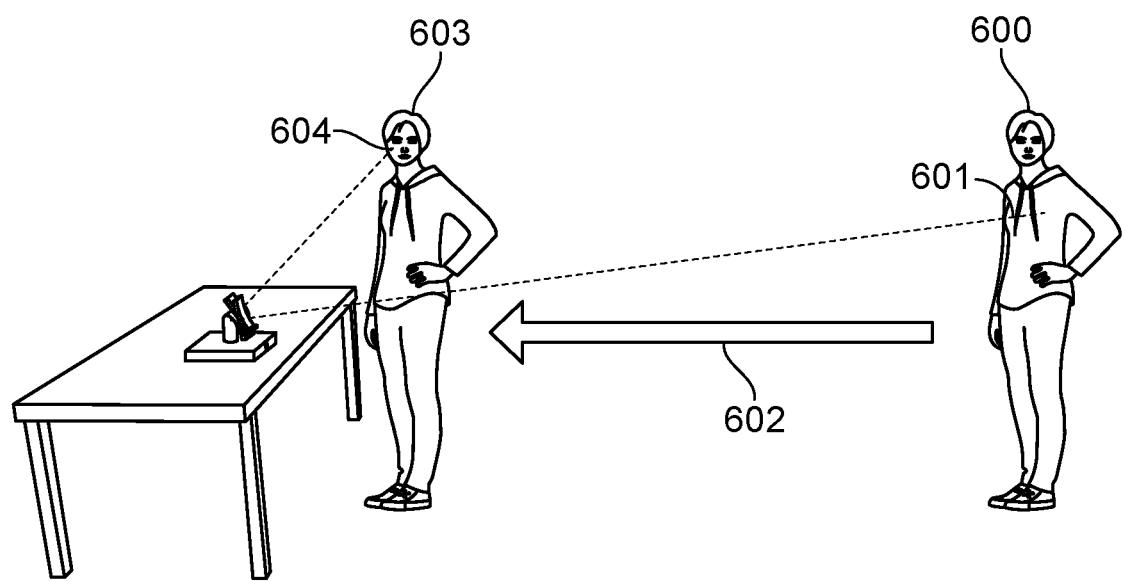
FIG. 8 provides an illustrative view of the MTDS movement when a user moves closer to the MTDS.
Figure 9:
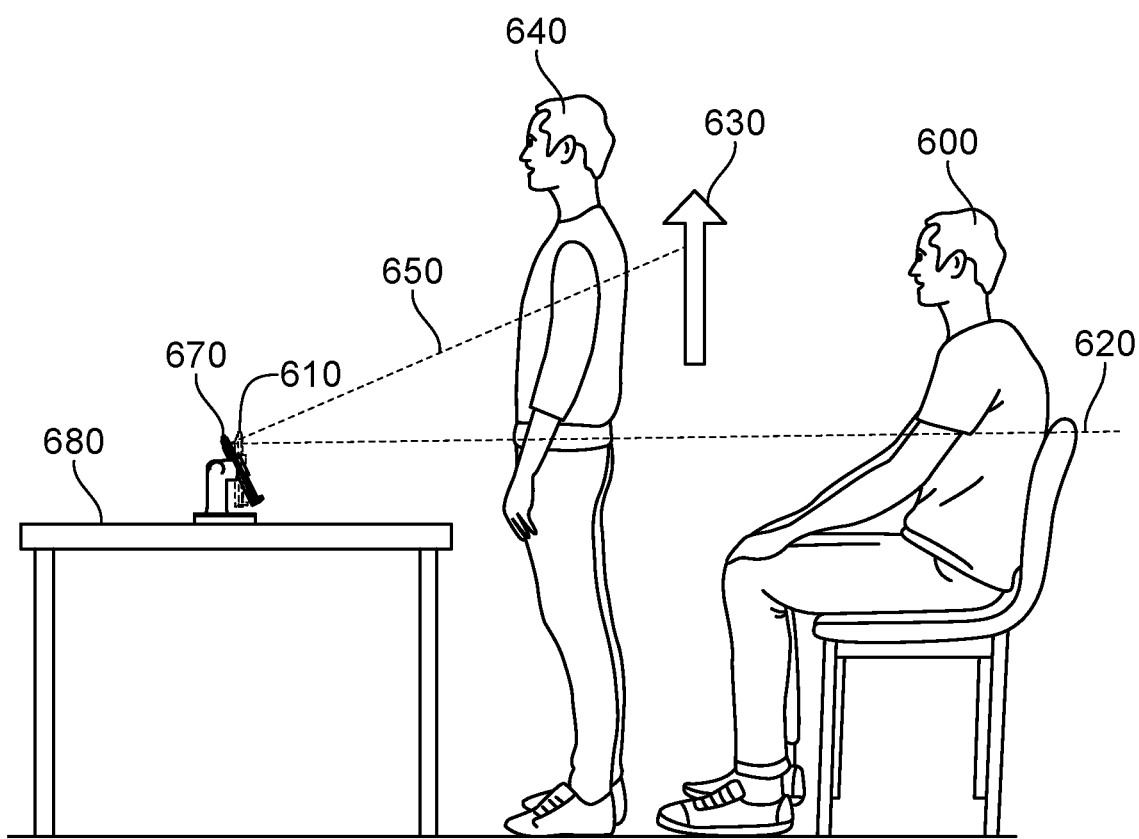
FIG. 9 provides an illustrative view of the MTDS movement when a user stands from a seated position.
Figure 10:
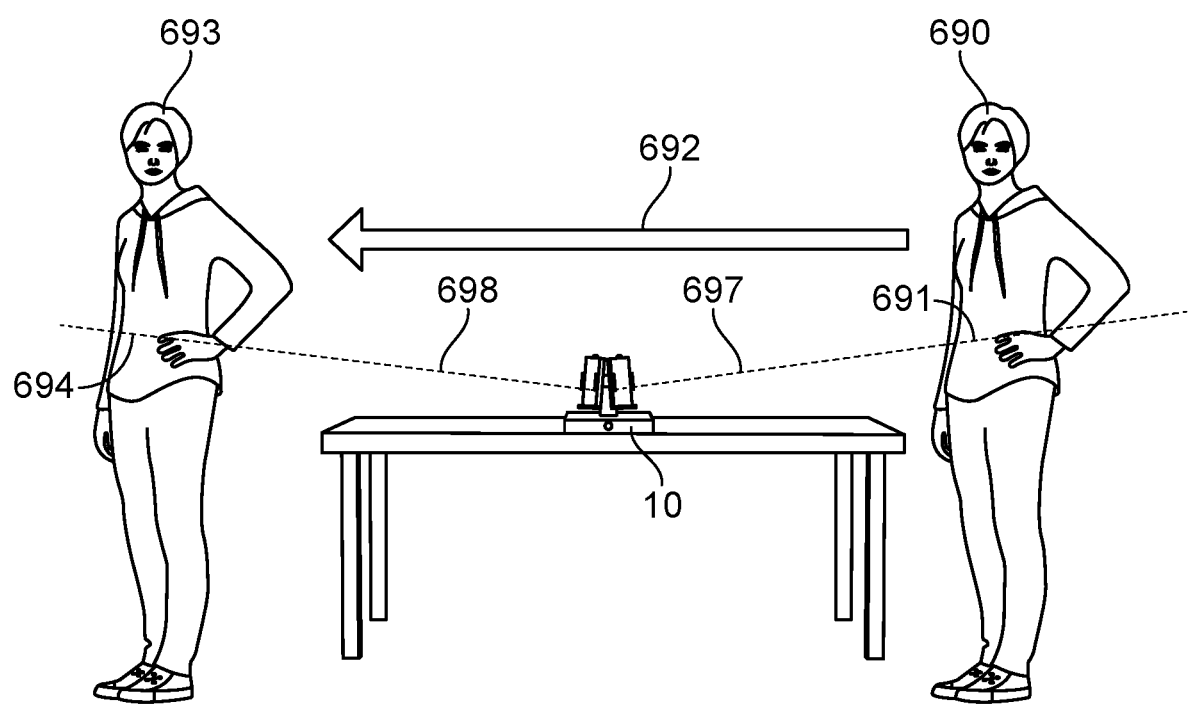
FIG. 10 provides an illustrative view of the MTDS movement when a user moves from right to left.

FIGS. 8-10 further illustrate how the MTDS 10 tracks a user's position during movement. FIG. 8 is a side view that shows how the Y-Axis Motor 250 changes its angle upwards as the user 600 moves closer to the MTDS 10. Initially the user 600 is several steps away from the MTDS 10 and the attached camera device 90. In this illustration the MTDS 10 is configured to initially have the camera device 90 centered on the torso 601 of the user 600. As seen in FIG. 8, the center line of the sensor's field of view for this initial position is on the user's torso 601. Next the user moves forward and closer to the MTDS 10 and attached camera device as illustrated by the arrow 602 to a new position 603. The MTDS 10 corrects the position of the y-axis rotation support 90 by sending the motor control sub-system 230 a new angle to move to. The movement of the y-axis rotation support changes so that the sensor's field of view center line is on the user's new position 603 and more specifically on the face 604 of the user.

FIG. 9 is a side view that shows how the y-axis rotation support 670 changes its angle upwards as the user moves from a seated position to a standing position. Initially the user 600 is seated in a chair in front of the MTDS 10 and attached camera device 90. Position 610 shows the position of the y-axis support housing 40. The center line 620 of the sensor's field of view for the initial position is on the user 600. Next the user 600 stands up as illustrated by the arrow 630 to the new standing position 640. The MTDS corrects the position of the y-axis rotation support by sending the motor control sub-system a new angle to move to. The movement of the y-axis rotation support 90 repositions so that the sensor's field of view line 650 is centered on the user's new position. Position 670 shows the MTDS's new position. A table 680 is typically used that the MTDS may rest on top of.

FIG. 10 provides an illustrative view showing how the x-axis rotation support changes its angle as the user moves from left to right. Initially, the user 690 is on the right side of the figure in front of the MTDS 10 and attached camera device. Line 697 shows the center line of the stand camera's field of view for the initial position which is directed to the user's 690 torso 691. Next the user moves from right to left as illustrated by the arrow 692 to the new position 693. The MTDS 10 corrects the position of the x-axis rotation support 20 by sending motor control sub-system 230 a new angle to move to. The movement of the x-axis rotation support now changes so that the MTDS 10 sensor's field of view is centered on the user's new position 693 and is still pointed at the user's new torso position 694.

FIGS. 8, 9, and 10 illustrate three specific movements or ways the MTDS 10 tracks movement of the users, but not all of the movements. Additionally, the MTDS 10 will track user's movement from back to front, from down to up and left to right. Finally, this movement tracking is performed automatically and continuously when the MTDS 10 is activated. In addition, the MTDS 10 is able to automatically adjust based on location of the user to focus on the user's torso or face.

Figure 11A:
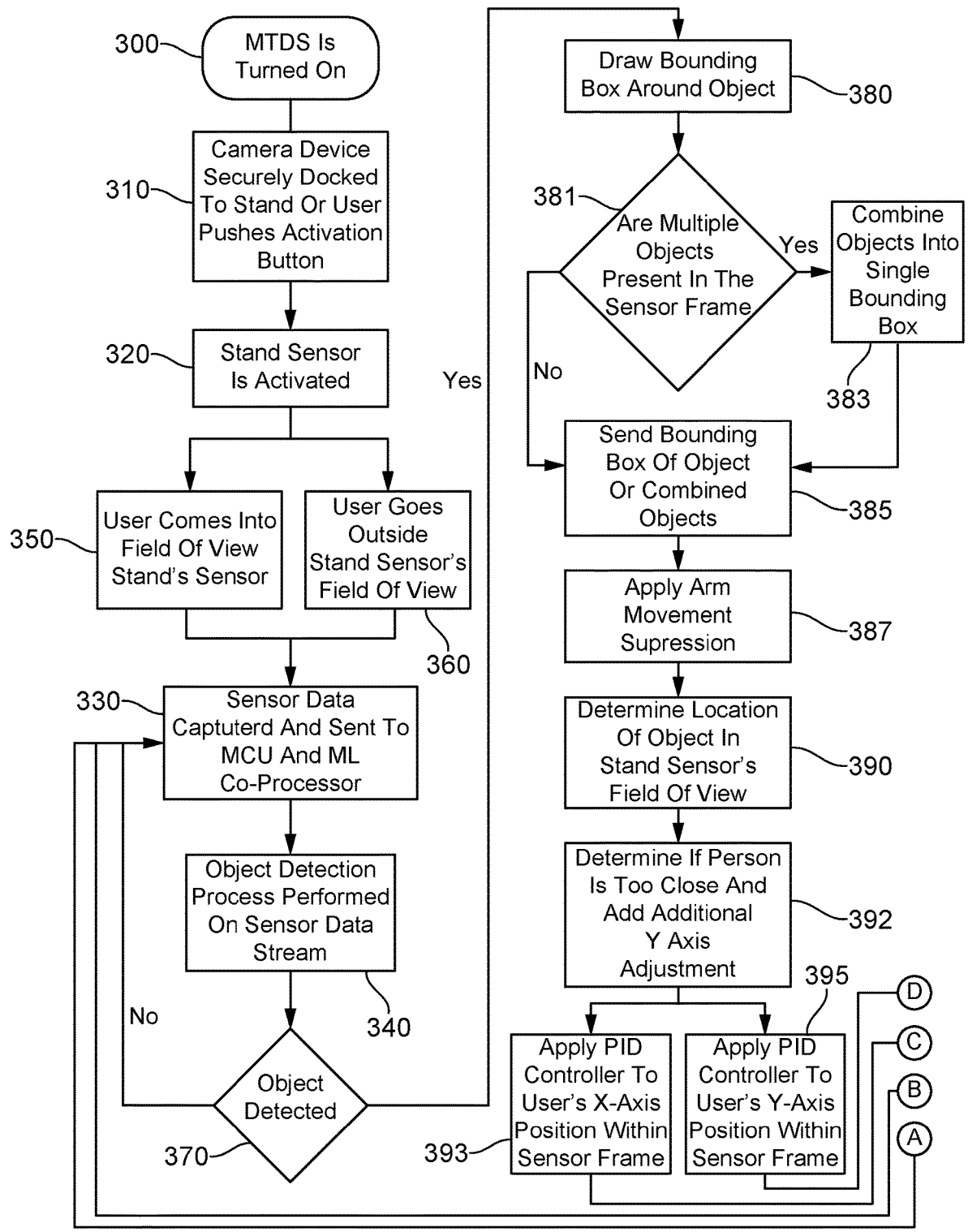
FIG. 11A provides a flow chart illustrating the initial flow logic performed by the movement tracking mobile stand.
Figure 11B:
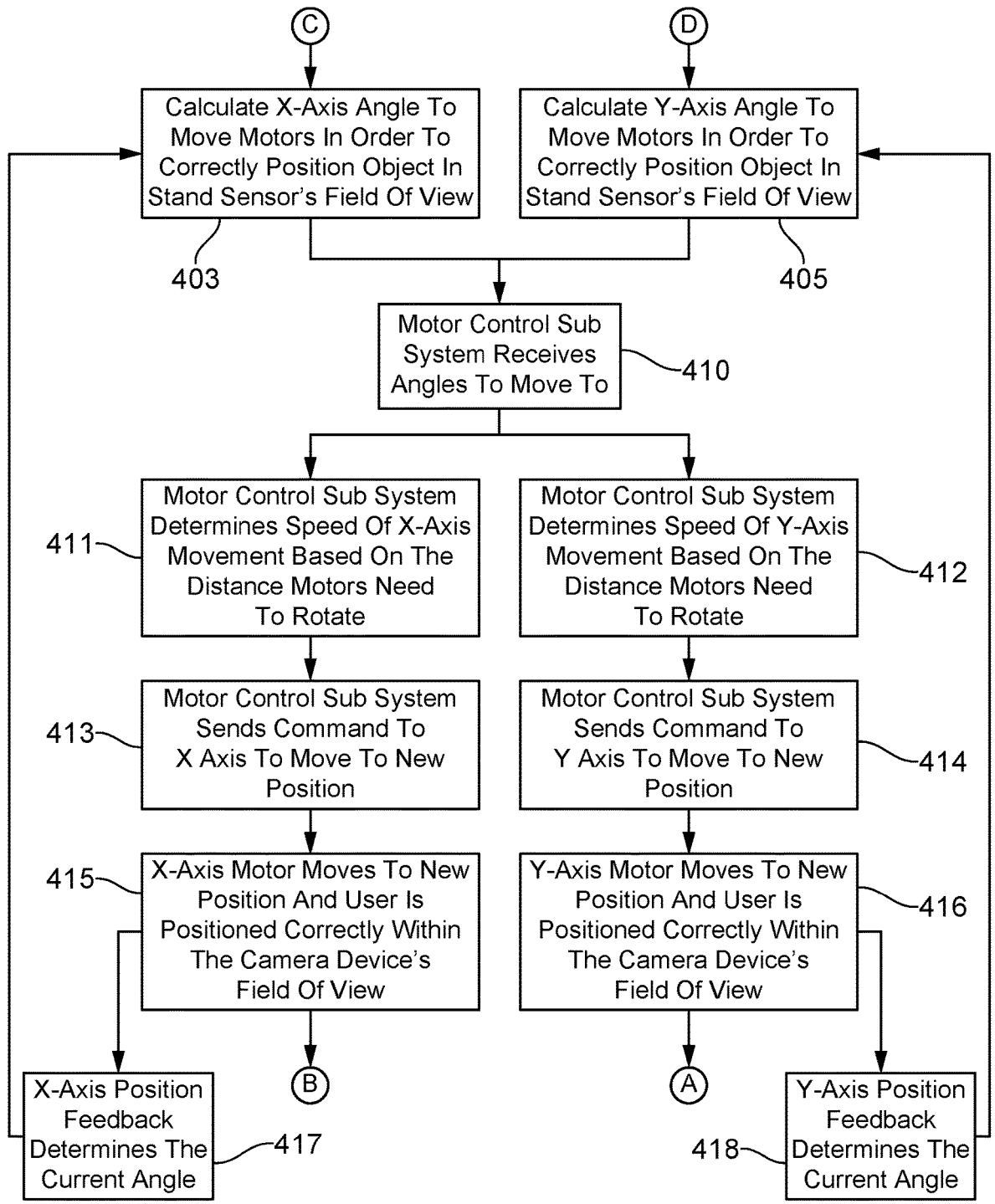
FIG. 11B provides a flow chart illustrating additional flow logic performed by the movement tracking mobile stand.

FIGS. 11A and 11B provide a flow chart illustrating the analysis the movement tracking device stand implements to track an object. The MTDS 10 is turned on 300 and a camera device is securely docked to the stand or the user pushes the activation button 310. In one possible embodiment, 300 and 310 are combined into a single step. The stand sensor is activated 320 and the user comes into the sensors field of view 350 or the user goes outside of the sensor's field of view 360. In either scenario the system captures sensor data and the sensor data stream is sent 330 to the MCU 210 and ML co-processor. Object detection is performed on the sensor data stream 340. The MCU 210 and ML co-processor 220 observe, from analyzing the sensor data stream whether the user came into field of view of stand camera or if the user went outside the stands camera's field of vision. If an object is not detected during step 370, then step 330 is performed again until the sensor data reflects a user coming into the sensor's field of view.

If the object is detected in step 370, then the MCU 210 or ML co-processor 220 draw a bounding box around the detected object in step 380. The system then determines in step 381 if there are multiple object present. If yes, the system combines the objects into a single bounding box in step 383 and sends or passes the bounding box information in step 385 to step 387 to apply arm movement suppression. If in step 381 it does not find multiple objects, it proceeds to send or pass the bounding box information in step 385 to apply arm movement suppression in step 387.

Then, in step 390, the MCU 210 or ML, co-processor 220 determines location of the object in the sensor 200 field of view. The system determines if the person or object is too close and adds additional y-axis adjustment in step 392. The system then applies a PID controller to the x-axis position (step 393) and a PID controller to the y-axis position (step 395). The PID controller can either be applied sequentially or in parallel. In the next step 403, the x-axis angle to move the x-axis motor is calculated. Likewise, in step 405 the y-axis angle to move the y-axis motor is calculated. Steps 403 and 405 can be performed sequentially or in parallel. The x-axis angle and y-axis angle are then received by the motor control sub system in step 410. This step is performed as a single operation, but the x and y-axis movement angles could be sent sequentially as long as the data can be sent and received in real-time.

Next the motor control subsystem determines the speed of movement for the x-axis motor in step 411 and the y-axis motor in step 412. 411 and 412 can be performed either sequentially or in parallel. The motor control sub system then sends a command to the x-axis motor in step 413 and the y-axis motor in step 414. 413 and 414 can be performed either sequentially or in parallel. The x-axis motor then moves to the new position in step 415 and the y-axis motor moves to the new position in step 416 which correctly positions the user in the device camera's frame of view. This process is repeated as both the x-axis and y-axis flow back to step 330 to repeat the process as the user continues to move. In addition, after step 415 the x-axis position feedback is used to determine the current angle of the x-axis motor which is then used in step 403 to calculate the next angle of movement for the x-axis motor. Likewise, after step 416 the y-axis position feedback is used to determine the current angle of the y-axis motor which is then used in step 405 to calculate the next angle of movement for the y-axis motor. The flow in FIGS. 11A and 11B can be interrupted by the user pressing the activation button.

In the MTDS embodiment that uses person detection, the MTDS can continually position the MTDS to ensure there is a gap or margin between the top line of the bounding box and the top of the sensor frame as illustrated in step 392. As the user moves closer the bounding box will become larger in the frame. The top line of the bounding box will move up in the frame. In this embodiment of the MTDS 10, when the top line of the bounding box reaches a pre-set threshold, the y-axis motor 63 is sent commands to move up. If the user keeps moving closer to the MTDS 10, when the top line of the bounding box hits the pre-set threshold again the y-axis motor 63 is commanded to move up again. This process repeats to ensure there is always some minimal distance or margin between the top line of the bounding box and the top of the sensor frame. The MTDS may implement this as a bounding box margin module within the MCU. The bounding box module would receive bounding box data from the sensor and/or machine learning co-processor. This approach of ensuring a minimal distance in the sensor frame can also be used as a trigger for switching to face detection. Both possible embodiments ensure the user's face is always visible to the camera device's camera.

The flow chart contains an algorithm called Proportional Integral and Derivative (PID) Controller 393 and 395. The purpose of this algorithm is to prevent overshoot and excessive oscillations of the camera device as the user moves to a position and stops. When a user moves, the object detection process determines their location within the frame. Next the MTDS's algorithm will determine the angle for the x-axis or y-axis motor to move to so that the user is at the desired position within the sensor frame. Without a PID controller in place, the angle will overshoot the correct position by a small amount. The next time this process is run, the calculated angle will be a bit closer to the desired position but off by a small amount. This loop reruns and causes oscillations until the user is at the desired position in the sensor frame. This results in excessive movement of the camera device resulting in a poor user experience. The PID controller is meant to correct the overshoot and thereby the oscillations. The PID controller operates by calculating the error from a setpoint and tries to eliminate this error. The setpoint for the MTDS is the desired position of the user in the sensor frame. The position of the user within the sensor frame is fed to the MD controller. This value is sent through three components:

Proportional—which multiplies a constant with the inputted value
Integral—which take the integral of the current value and the past value and multiplies the result by a constant
Derivative—which takes the derivative of the current value with the past value and multiplies the result by a constant The proportional, integral and derivative results are all summed together to provide a value that helps prevent overshoot and excessive oscillations. The proportional, integral and derivative components all have separate constants. These constants must be tuned so that the device does not overshoot the desired position but is also responsive to fast user movements. If tuned incorrectly the MTDS will overshoot the user, causing excessive jitter until it settles on the correct position or will be slow for specific use cases such as tracking children who tend to move very quickly in front of a camera device.

In the embodiment that utilizes a camera as the sensor, 403 and 405 use a Multi-Axis Ternary Mapping algorithm to calculate the angle to turn the MTDS's camera device holder. This algorithm maps the pixels on the camera frame to the camera's field of view to the physical angle of rotation of the MTDS's camera device. This algorithm is run twice within each iteration of the real-time control loop, once to determine the x-axis angle to rotate to 403 and another time to determine the y-axis angle to rotate to 405. The algorithm divides the camera's field of view into sectors. Since the camera's field of view is known at design time, the field of view is divided by a positive integer. This divides the field of view into sectors. Ideally this number should be odd. An odd number allows for a sector that is bisected at the midpoint or the midpoint line of the sensor's field of view. This sector is where the MTDS aims to keep the user centered, when using the embodiment that centers the user in the camera device's frame. While an even number can be used to divide the field of view, the user will be slightly offset from the center at the preferred sector. The sectors are labeled with another integer. The center sector is labeled 0, the immediate sector to the right is labeled 1, the immediate sectors to the left is labeled −1. The sectors immediately to the right and left of sector 1 and −1 are labeled 2 and −2 respectively. This pattern repeats until the desired number of sectors are reached and the entire field of view is labeled by an integer. Each sector is of the same size. This sector labelling is performed for each axis and is labeled when the MTDS starts up.

At design time the camera's resolution is known. For instance, in one possible embodiment the MTDS could use a 320 pixel×240 pixel camera. Along the x-axis it is known that there are 320 pixels. If the camera's field of view is 30 degrees along the x-axis, then the x-axis can be divided into 10 sectors and there will be 32 pixels per sector. The PID controller 393 outputs center of the object along the x-axis, the algorithm will then perform a search operation to determine which sector the user(s) center is in. If the user is already centered, thereby in sector 0, and does not move outside of the center sector the algorithm will go back to step 330. If the user is in another sector, the algorithm will multiply the sector label by the degrees per sector. This value provides the distance to be moved by the motor to place the detected object in the center of the sector. The distance to be moved is added to the last position of the motor from the position feedback function 417. This process is repeated for the y-axis. The number of sectors can be made larger or smaller at design time to provide more precise tracking or greater stability when the user is not moving. For instance, if a larger number of sectors is used, the degrees per sectors goes down. This enables the MTDS to more accurately place the user in the center of the camera device's camera frame. This increase in accuracy also means that more subtle movements from the user are identified by the algorithm making the MTDS responsive to very small movements. For larger sectors, small movements are not identified by the algorithm leading to a steadier camera when the user is not moving.

The bounding box will change location and size based on the user's movement within the sensors frame. If the user moves backwards the bounding box will get smaller. If the user comes forwards the bounding box will get larger. If the user turns sideways the bounding box will be smaller. If the user crouches the bounding box will also become smaller. The bounding box can also change size due to undesirable factors. The algorithms used in the object detection process may not be 100% accurate. Since the object detection process runs multiple times per second, there are very fast variations in bounding box size unrelated to a user's movement. A PID controller may not be sufficient to deal with these variations. One or more mathematical techniques may be leveraged including but not limited to moving average, filtering anomalous values or smoothing techniques that operate in real-time.

There are often multiple people present in a sensor frame while the MTDS is in operation. In one possible embodiment, the object detection process outputs bounding boxes for each individual. These bounding boxes are then combined into one large bounding box, step 383. This approach ensures that the camera device's frame incorporates all of the individuals in the frame.

Figure 12:
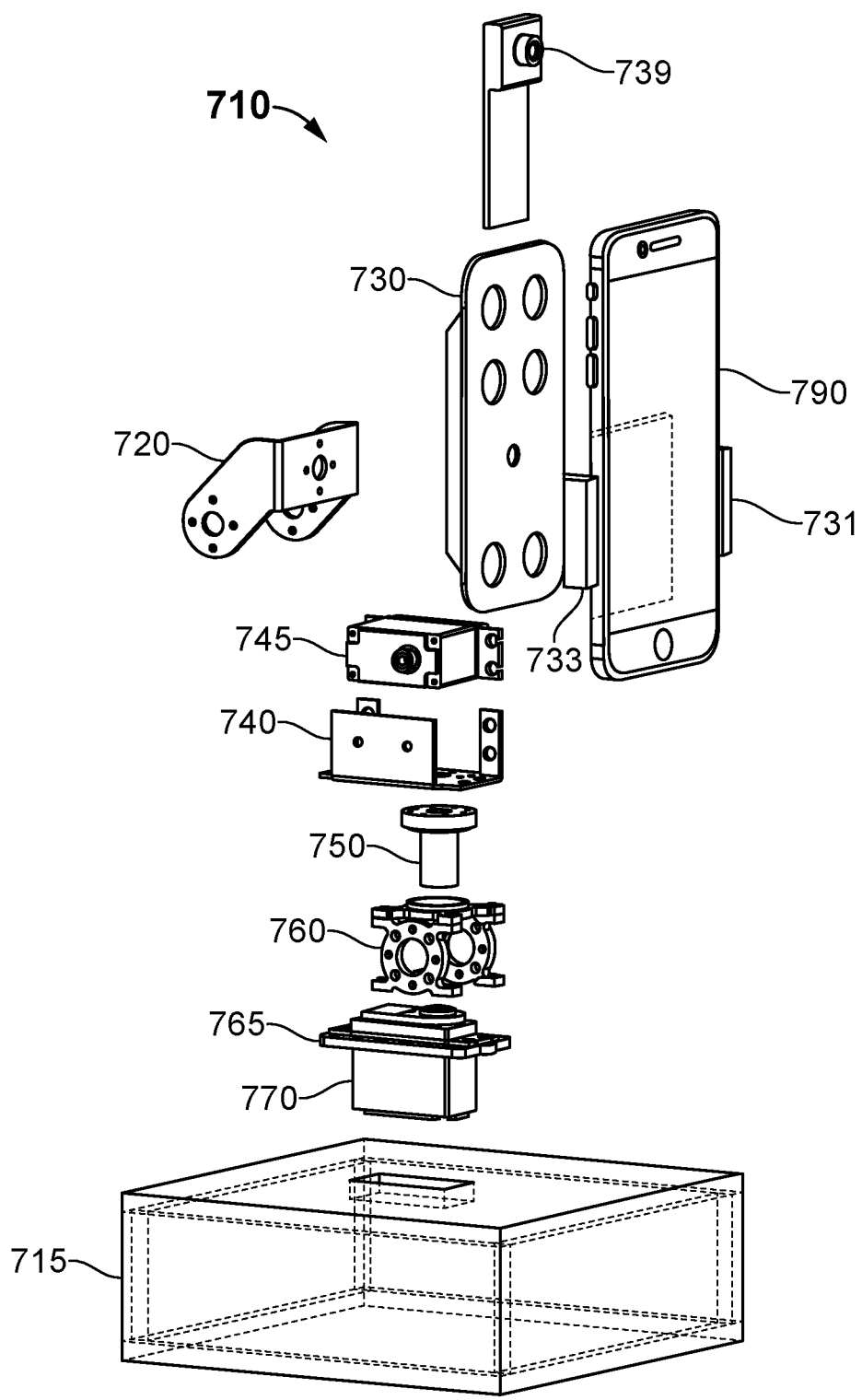
FIG. 12 shows an exploded view of an alternative embodiment of the present invention.

FIG. 12 provides an illustrative exploded view of an alternative embodiment of the movement tracking device stand or MTDS 710. As seen in FIG. 11, the MTDS 710 includes a device stand sensor 739, a y-axis rotation support bracket 720, a y-axis servo or motor 745, an x-axis rotation support bracket 740, an x-axis servo spline shaft hub 750, a servo support apparatus 760, a motor mount 765, an x-axis servo or motor 770, the mobile device stand electronics enclosure base 715, a mobile device holder backing 730, and mobile device holder clips 731, 733 for holding a smart device 790.

At the bottom of the MTDS 710 there is an enclosure or base 715 which provides a solid platform for the MTDS 710. The base 715 encases the electronics and supports the motors 745, 770, brackets 720, 740, servo support 760, sensor 739, hub 750, and the mobile device holder 730 with clips 731, 733.

The servo support apparatus 760 is connected to the top of the x-axis motor 770 by mating with the motor mount 765 and the base of the x-axis motor 770 fits within an opening of base 715. The servo support apparatus 760 supports the weight of all the components above it and the mobile device 790. The servo support apparatus 760 is configured to mate with, or connect to, the x-axis motor 770 and distributes the weight of the mobile device 790 and the other components of the MTDS 710. The x-axis motor 770 slides into the middle of the bottom bracket or motor mount 765 which is configured to mate with the servo support apparatus 760. An upper portion of the x-axis motor 770 mates with the motor mount 765. The motor mount 765 has edges or perimeter flanges allowing it to rest on the top surface of the base 715 and provides a connection point for the servo support apparatus 760.

The alternative embodiment of the MTDS 710 includes a panning assembly that controls the panning and a tilting assembly that controls the tilting of the MTDS 710. The panning assembly is comprised of the x axis motor 770, the x-axis rotation support bracket 740, and the x-axis servo spline shaft hub 750. The tilting assembly is comprised of the y-axis motor 745 and the y-axis rotation support bracket 720. The panning assembly works when the x-axis motor 770 rotates the mobile device 790 in a horizontal rotation from left to right, i.e. panning. The tilting assembly works when the y-axis motor 745 working in concert with the rotation support bracket 720 rotates the mobile device 790 in a vertical rotation or an arc from front to back, i.e. tilting, thereby moving the mobile device 790 as the user moves closer or farther away from the MTDS 710.

The x-axis servo or motor 770 connects to the x-axis servo spline shaft hub 750. A hole in the center shaft of x-axis servo spline shaft hub 750 connects to geared splines of x-axis motor or servo 770. When the x-axis motor 770 receives signals from the electronics to move right or left along the x-axis, the x-axis spline shaft hub 750 rotates along with the servo motor 770. The bottom of the x-axis rotation support bracket 740 is connected to the top of x-axis spline shaft hub 50. As the x-axis spline shaft hub 750 rotates right and left it causes the x-axis rotation support bracket 740 to rotate.

The y-axis motor or servo 745 is secured inside of the x-axis rotation support bracket 740. The y-axis motor 745 has geared splines which connect to the y-axis rotation support bracket 720. The mobile device holder backing 730 is connected to the y-axis rotation support bracket 720. As the y-axis motor 745 rotates the mobile device holder backing 730 it moves along an arc orienting the mobile device stand sensor 739 toward the user of the MTDS 710.

This additional embodiment of the MTDS 710 uses a closed feedback algorithm to correctly position the stand's sensor or camera 739, and thereby the device's sensor, at the user as they move in front of the device 710. The objective of this closed loop algorithm is to keep the user centered in front of the sensor 739 of the device stand 710 and the mobile device 790 camera's frames, respectively. The device 710 may include a single button to start and stop movement tracking. When this button is pressed by the user, the sensor 739 begins operation. The sensor 739 detects the light from the scene and then encodes into a data structure as a digital representation of the scene. This data structure is passed to the microcontroller (not shown) along a cable or data bus. The microcontroller will then run a software algorithm to detect the presence of an object such as a person or a face. Similar to the primary embodiment previously discussed, the secondary embodiment uses the microcontroller, software, an AI/ML co-processor, various algorithms and a pre-trained artificial intelligence model. This model is loaded into memory of the device 710. When the data structure representing the image arrives from the device's sensor, that information is sent through the artificial intelligence model in memory. This process is often computationally expensive; therefore, the AI/ML co-processor may be used to ensure the image data is processed quickly. The model then outputs the location of the object within the camera frame. Next, software on the microcontroller calculates how far off from the center the sensor frame is. Based on this offset, software calculates the angle the x and y axis services need to move so that the user can be centered in the camera frame. This angle is then sent to the x and y axis motors. In one embodiment, the angle is sent using a Pulse Width Modulation (PWM) signal. Software translates the angle into a correct PWM pulse width and then sends it across a cable, wire or bus. In other embodiments, the motors or servos receive the information through other means such as a two-wire serial connection or an I2C bus connection.

Device holder backing 730 provides a flat surface for the back of the mobile device 790 to rest on. The device holder backing 730 rotates to allow the mobile device to be rotated into either landscape or portrait mode. Device holder clips 731, 733 hold the device 790 against the device holder backing 730 to keep it from falling off or moving during operation.

The MTDS stand sensor or camera 739 sits atop the swiveling assembly and provides a video stream of the area in front of the MTDS 710. This video stream is passed to the microcontroller unit (MCU) and then to the machine learning co-processor which performs face and/or object detection. The movement tracking mobile device stand 710 provides an attachment point and a stable foundation for the swiveling portion of the apparatus. When the mobile device 790 is securely docked to the stand 710, the mobile device's camera points in the same direction as the MTDS sensor 739. In an alternative embodiment, the stand's sensor 739 may be adjusted linearly across the x-axis so that the stand's sensor or camera 739 can be aligned with the device camera's location. Additionally, in an alternative embodiment, the stand's sensor 739 can be adjusted linearly on the z-axis in order to accommodate various phone heights. In another embodiment a 180-degree field of view camera (such as a fisheye camera) can be mounted on the device stand 710. This 180-degree camera could have a complete field of view in front of the device stand. Therefore, the stand's camera would not need to physically move and would be stationary. Software would be used to account for the differences in view between the stand's camera and the device's camera.

The MTDS 710 continuously and autonomously tracks the movement of the user during a video conference session or camera/video recording without the use of a remote, separate person to control the mobile device or a dongle the user must wear. This enables hands free movement tracking within a room. The stand 710 does not require physical/wireless connections or software interfaces to the device 710 in order to function.

Since movement tracking is performed by the MTDS 710, the user can use any app available on the mobile device for video conferencing while using the MTDS 710. Since movement tracking is performed locally on the MTDS 710 (rather than in the cloud) no internet connection is required. Without an internet connection the device cannot be remotely hacked. This increases the privacy of the device and decreases a potential user's concerns over the device being used to spy on their home or office.

The MTDS 10 may come in various sizes, a larger version of the MTDS 10 can accommodate devices such as tablets or other electronic devices such as a smart personal assistant with a camera (i.e. Amazon Echo, Google Home, etc.), a Digital Single Lens Reflex Camera (DSLR), an Action Cam (i.e. GoPro Hero), a webcam or a laptop computer with an embedded webcam.

Lighting may be attached to the MTDS 10 around the camera device and can be used to provide automatic lighting of the scene in front of the device's camera. This allows subjects to be well lit and counteract back light scenes that cause the background to be well lit, but the subject to be dark.

In one possible embodiment the MTDS will incorporate a tripod mount on the bottom of the Device Stand Base 15. This mount allows the MTDS to be screwed into a tripod mount or tripod quick release plate. This provides the user with ability to attach the MTDS securely to a tripod and allows for video conferences, recording of video or photography at an elevated height or in places where there is no surface to place the MTDS.

In an alternative ruggedized embodiment, the stand is water resistant and prevents particulates, such as saw dust, from getting into the MTDS 10. Additionally, this version of the MTDS 10 protects the camera device from water and particulates. This version is intended to be used in work areas where a user needs help from an expert on building or repairing.

In one possible embodiment, the MTDS 10 can move the camera device left and right linearly across the x-axis. This enables the MTDS 10 to create dramatic, cinematic moving video clips without a separate camera person.

In another possible embodiment, the MTDS 10 can move the camera device up and down linearly across the z-axis. This enables the camera device's 90 camera to be at the same height with the user's face rather than pointing up at them. The MTDS 10 does not have control over the camera device's 90 camera. Therefore, it can't change the field of view of the camera device's camera without physically moving the camera device. In one possible embodiment, the x-axis rotation support 20 is configured to both pan and tilt. Combined with the tilt from the y-axis rotation support 40, this will physically move the camera device 90 forward and therefore zooming into the speaker or user.

In one possible embodiment, the MTDS will have an array of microphones to determine the direction of a speaker's voice to perform automatic speaker direction detection. For instance, if there are multiple users in the camera device's frame, the MTDS's object detection process will output the location of multiple objects within the sensor frame. Using the direction of the speaker's voice, the MTDS can correlate which object is in that direction. Now that MTDS has the specific location of the speaker within the sensor's frame, the other objects will be filtered out and the MTDS will orient the camera device's camera toward only the speaker. An object tracking process will be needed to ensure that the object representing the speaker is not confused with other objects. If the active speaker passes behind another person and continues speaking; the tracking process ensures that the MTDS focuses on the speaker and doesn't accidentally switch to the person in the foreground. When the speaker changes, this process is repeated so the MTDS orients toward the new speaker in the scene. The movement between speakers would need to be gradual so that the camera device's video does not appear jerky or jittery. Jerky video creates a poor user experience for the remote user in a video conference. If both speakers in the scene quickly alternate speaking, then the MTDS can fall back on focusing on both speakers at once. In an alternative embodiment of this function, the MCU and ML co-processor can determine which speaker's lips are moving. If a neural network is used, then the network can be trained to only identify speakers vs people who are eating or drinking.

In the embodiment with the microphone array, the MTDS can also respond to voice commands. A user says a preprogrammed wake word, such as "CleverMov" and then speaks the command. On possible feature, is to tell the MTDS to start or stop motion tracking by issuing the command—"CleverMov, start tracking motion" or "CleverMov, stop tracking motion". These commands are the same as pushing the Activation button on or off, respectively. Another possible feature is to tell the MTDS which speaker to focus on. When the user speaks the command "CleverMov, track me" the MTDS will use the direction of the speaker to filter and then track that specific user. This approach allows the user to direct the MTDS to track a specific speaker in a handsfree manner.

In one possible embodiment, the MTDS can rotate in continuous circles (beyond 360 degrees). If a user places the MTDS on a kitchen island, then walks in circles around the island, the MTDS continuously tracks their movement.

In one possible embodiment, the MTDS will provide an out of frame search function. If a user moves outside the field of view of the sensor, the MTDS could remember the direction of the user and can continue to track the user in that direction even though no object is detected. Out of frame search is useful when a user moves too fast for the MTDS.

If the MTDS embodiment contains a microphone array, voice direction can also be used in situations when a user moves out of frame. If the user is speaking, but outside of the sensor's field of view, then the MTDS can turn in the direction of the speaker until they are in the sensor's field of view. If the user has left sensor's field of view and the MTDS has panned to the limits of its range, then the MTDS could pan in the opposite direction until it finds a user or reaches the opposite side of its range of motion. The audio position adjustment may be implemented as an audio module within the MCU which determines audio location from the microphone array and adjusts the determined new x-axis position and new y-axis position based on the audio location data or information.

As the user moves farther away from the MTDS the volume from the camera device declines and is harder for the user to hear. In one possible embodiment, the camera device ledge or camera device clamp that is closest to the camera devices speaker can be shaped with an arc. This arc will naturally amplify the volume from the camera device. For instance, in the smartphone embodiment of the MTDS, most smartphones have their speakers at the bottom of the smartphone. Therefore, the arc shaped design would be engineered into the camera device ledge.

On some smartphones, the microphone is placed very close to the speakers at the bottom of the phone. If a solid surface is placed directly under the speakers, the audio will reflect back into the microphone. During a video conference as a remote user speaks, the audio of their voice comes out of the speaker, then reflects off the surface and bounce back into the microphone. This results in the remote user hearing a terrible echo of themselves. This creates a poor user experience for the remote user. To solve this problem, in one possible embodiment of the MTDS, the ledge or clamp surface is designed to minimize or eliminate these reflections. For instance, in the smartphone embodiment, the camera device ledge surface could consist of a sound absorbent material, use a vented design to allow most of the sound waves to pass through the ledge, or be designed with a diffusive surface that sends the sounds waves in many different directions to minimize reflections.

The MTDS must be quiet during operation. If the motors make noise while in motion, the camera device's microphone will pick up the sound. During a video conference, the remote user will hear the motors in operation creating a distracting user experience. During a videography session, the motor noise will end up in the recorded video. Therefore, ideally, the MTDS will use quiet motors. One possible embodiment integrates sound dampening materials inside the x-axis rotation support 20 and the y-axis rotation support 40 to absorb and/or diffuse sound waves from the motors.

A typical mobile phone clamp will have a spring inside that provides tension when the user pushes one end of the mobile phone clamp. In some of these clamps, the opposite end of the clamp will move at the same time a force is pushed outward. If such a mechanism is used on the MTDS it would require the user to open the clamp with one hand, then place the camera device in with the other. Therefore, this is often a two-handed operation, which is less than ideal for the user. This requires them to put the item in the non-camera device bearing hand down, before securing their camera device to the MTDS. Therefore, a clamp that requires two hands could be an impediment to use and an accessibility issue for disabled users with one hand.

In one possible embodiment of the MTDS, a Tri-Directional Camera Device Clamp could be used. When the camera device 90 is placed in landscape mode, camera device Holder rotates 90 degrees to the right or 90 degrees to the left. In the smartphone embodiment, the smartphone will automatically rotate the video to the correct orientation within the camera device. Once rotated to the to the 90 degrees left orientation, one camera device clamp 33 is now closer to the device stand base 15. Once rotated to the 90 degrees right orientation, the other camera device clamp 31 is now closer to the device stand base 15. When rotated to the portrait position the camera device ledge 35 is now closer to the device stand base 15. Therefore, in all orientations there is a ledge that provides an upward force to hold up the camera device.

In this embodiment the camera device ledge 35 becomes another camera device clamp. If a force is placed on the camera device ledge 35, it will cause the other two camera device clamps to open. If a force is placed on another camera device clamp to open it, the opposite camera device clamp and the camera device ledge would move open. This creates a larger space to place the camera device while the force is in place. As soon as the force is removed, a spring-based mechanism inside the camera device backing pulls the camera device clamps and ledge closed around the edges of the camera device.

In one possible embodiment, there will be a top camera device holder ledge in addition to the lower camera device holder ledge. The sensor housing will site on top of this protrusion. This allows the user to clearly position the camera device under the sensor housing, minimizing the probability that a user will clamp the camera device 90 in a way that covers the sensor up which would render the MTDS unable to track a user's movements. Additionally, this design positions the sensor closer to the device's camera, further increasing the positioning accuracy of the MTDS. In the Tri Directional Clamp Device Clamp design, this protrusion below the sensor housing provides a stop. The spring mechanism pushes the lower camera device ledge 35 up against the camera device 90, which in turn will push up against the upper camera device ledge 35.

The Tri-Directional Camera Device Clamp allows the user to secure the camera device to the MTDS 10 using one hand. For example, if the smartphone embodiment MTDS is in a portrait orientation, the user can place the bottom edge of the smartphone on to the top surface of the camera device ledge 35 and press down. The downward force causes the left and right camera device clamps 31, 33 to open up. Then the user gently pushes the back of the smartphone onto the front surface of the camera device holder 30. Once in place, the user can slowly reduce the downward force until the left and right camera device clamps 31, 33 push into the sides of the smartphone. The device stand base 15 will provide the mechanical stability to ensure the MTDS does not tip forward during this user operation.

In another example, if the smartphone embodiment is rotated 90 degrees to the left, into a landscape orientation, the user can place the bottom edge of the smartphone on to the top surface of the left camera device clamp 33 and presses down. The downward force causes the right camera device clamp 31 and camera device ledge 35 to move outward creating a larger space to slide in the smartphone. Then the user gently pushes the back of the smartphone onto the front surface of the camera device holder 30. Once in place, the user can slowly reduce the downward force until the right camera device clamp 31 and camera device ledge 35 push into the sides of the smartphone. Once again, the device stand base 15 will provide the mechanical stability to ensure the MTDS does not tip forward during this user operation. This mechanism will also work when the camera device holder 30 is rotated 90 degrees to the right.

In another alternative embodiment, the MTDS 10 does not have a sensor nor does it perform object detection. Rather the camera device's camera and processing resources are leveraged to perform those functions. The MTDS 10 and camera device are connected through a data connection. The camera device sends information to the MTDS 10 which then turns the camera device to be aligned with the user. This approach requires software integration with the camera device but reduces the cost of the stand. This embodiment may be useful in an OEM or licensing situation where the camera device, video conferencing service or app prefers to distribute an MTDS specific to their needs.

Since the device is not connected to the internet, firmware and AI models may be updated using an app on a smartphone in one embodiment. Users may download the app through their respective app store for their device. Once the mobile device is connected to the device stand through a wired connection or wirelessly through Near Field Communications (NFC), the mobile app can download the firmware updates from the internet, store them locally on the mobile device, then upload the firmware updates directly to the device stand.

In an additional alternative embodiment, the object detection process uses an approach called person detection algorithm. This algorithm typically uses a deep learning neural network which draws a bounding box around a person in an image. This algorithm is trained offline, prior to the software implementation of this algorithm being deployed to the MCU and its associated memory. The training process requires a training data set that is labeled. The labels consist of the coordinates for the bounding box around the object and description of the object inside the bounding box. Often academic researchers have developed these algorithms using training data gathered as part of their research or by a separate research project. In the case of person detection, the training data used has bounding boxes around the entire person including outstretched arms and legs. When people move their hands in expressive motions while speaking, the person detection bounding box changes size. These size changes happen very quickly. This quickly varying bounding box will cause the MTDS to track the motion of the local user(s) very quickly. This results in very jittery video for the remote user or on the recorded video. To account for this problem there are several potential solutions in the embodiment that uses person detection. One approach is to reduce the size of the bounding box by some percentage. With this approach the MTDS tracks only a portion of the hand motion but results in a less jittery experience. Another approach is to use training data that only detects a person's upper torso and head. This approach does not track hand motion, focuses the camera device's camera on the upper half of a person's body (not including their legs), but is less jittery.

It may be desirable to track hand motion in some cases but not in others. For instance, if a person is reaching for a glass of water, it may not be desirable to track their arm or periphery movements. But if a person is dancing or exercising it may be desirable. In one possible embodiment, human pose detection can be used to determine what activity a person is doing. Based on this activity, the MTDS could choose using a fraction of the bounding box for desired activities or torso detection for non-desired activities. In another possible embodiment, a physical switch on the surface of the device stand base 15 can be toggled by the user to turn on/off the tracking of arm or periphery movement data.

In order to improve the accuracy of the device stand, the MTDS may perform a function called onboard transfer learning. First, the device takes pictures or videos, which are only stored locally on the device within the onboard storage. When the device is powered but not in use, an onboard software service will run and perform deep learning training using this data. The device stand will train the new data, which is specific to its users, with the existing broader and generic model which is already embedded in the device's software. When they are trained this way, the resultant model decreases detection time and increases accuracy of the object detection process for a specific stand's users. The end result is that the device learns and becomes more effective at tracking users and their movement patterns which enables smoother and more effective movement tracking. This approach may also be used to track a specific user but not people in the background. If the MTDS is pre-trained with the desired user, it will only detect them and ignore others in the background. This transfer learning process could also be performed on a mobile device through an app which has more powerful processing capabilities than the device stand. The results of the transfer learning process would then be sent back to the MTDS using a cable or NFC.

In an alternative MTDS embodiment that uses person detection, as the person moves closer to the device, the sensor frame becomes filled with person's body, but their head may be outside of the sensor frame. Technically a person is correctly detected by the algorithm, but the MTDS does not adjust upward when a person is in close proximity. To solve this problem, in one possible embodiment, the MTDS can use a combination of person and face detection. During the offline training process, the deep learning network is trained with labeled data that includes people and faces. The trained algorithm will output a bounding box each time it recognizes a person and a face. As the person moves closer to the frame, the person bounding box will become larger. At a pre-set threshold, the MTDS will switch to using the face bounding box to orient the camera device's camera toward the user's face. As they move farther way, when the pre-set threshold is met again, the MTDS will switch back to using person detection. This face to person/torso function may be implemented as a subject position module, managed by the processor or MCU, which determines whether to focus on a torso or a face of a user based on location and movement of the user from the sensor data and machine learning co-processor bounding box data.

In an alternative embodiment, the object detection process uses a neural network to perform the object detection. Typically, neural networks are designed to receive images with an even aspect ratio. For instance, if the camera is capable of capturing images at 320 pixels×240 pixels, the neural network will only take in an image that's 240 pixels by 240 pixels. This even aspect ratio or square image simplifies the neural network and the training process. When the image is captured it must be pre-processed to reduce its size so that the neural network can take it in as input. In this embodiment, the sensor's field of view is essentially cropped. If the user is at the periphery of the sensor, they are less likely to be seen by the MTDS. In another possible embodiment, the neural network is designed to work with images that have the same aspect ratio as the sensor. This helps eliminate the issue of user not being seen by the sensor when they are at the periphery.

In another embodiment, the sensor's aspect ratio is aligned with the camera device's aspect ratio. Camera devices have sensors which produce rectangular images. In portrait mode the height of the images is larger than the width of the image. In landscape mode the width of the image is longer than the height of the image. If the camera device is positioned in portrait mode on the MTDS, the sensor's orientation will align with the camera device's aspect ratio in this embodiment. Therefore, in portrait mode the sensor's height will be longer than the width. When the camera device holder assembly is positioned in landscape mode, the sensor's width will be longer than the height to align with the camera device's aspect ratio. This approach allows the MTDS to have close to the same field of view as the camera device, further enhancing the positioning accuracy of the MTDS.

Another option is to use federated learning to improve model accuracy and reduce inference times. In this approach, the device captures pictures and videos of the subjects locally on board the stand in storage. When the stand is powered but not in use, it will generate a model. This model consists of deep learning parameters and contains no personally identifiable information about the users. The model can be uploaded through the mobile phone app after the firmware update process. Then the app uploads the model to secure servers on the internet. Many stands can upload these models. Each of these individual models is later combined with the more generic object tracking model in order to improve movement tracking accuracy. This new model is then incorporated into a software release. When the mobile device performs a firmware update the new, more accurate model with better performance is uploaded to the device.

As described herein, embodiments of the system of the invention and various processes of embodiments are described. The system of the invention or portions of the system of the invention may be in the form of a "processing machine," i.e. a tangibly embodied machine. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set a instructions may include various instructions that perform a particular task or tasks, such as any of the processing as described herein. Such a set of instructions for performing a particular task may be characterized as a program, software program, code or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example.

As noted above, the machine used to implement the invention may be in the form of a processing machine. The processing machine may also utilize (or be in the form of any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit or ASIC (Application Specific Integrated Circuit) or other integrated circuit, a logic circuit, a digital signal processor, a programmable logic device such as a SOC, FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running firmware directly on the processing machines hardware without an operating system often referred to as bare metal, the Windows 10 operating system, the Windows 8 operating system. Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system, IOS™ Android™, Raspberry PI OS, Yocto Linux, FreeRTOS, any real-time operating system, one or more containers running on top of another operating system, one or more virtual machines running on top of another operating system, a separate serverless function/process in the cloud or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed b two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, as also described above, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, Bluetooth, Zigbee, LoRA, Ultra Wideband (MB), 4G, 5G or any client server system that provides communication, for example. Such communications technologies may use any suitable protocol such as TCP/IP, UDP, or OSI, for example.

As described above, a set of instructions is used in the processing of the invention on the processing machine, for example. The set of instructions may be in the form of a program, software or firmware. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler, linker or interpreter. The machine language is binary coded machine instructions that are specific to a particular type of processing machine, i.e., to a particular type of computer, for example. The computer understands the machine language.

A suitable programming language may be used in accordance with the various embodiments of the invention, Illustratively, the programming language used may include assembly language, Ada, Arduino, APL, Basic, C, C++, COBOL, dBase, Forth, Fortran, Jaya, Modula-2, Pascal, Prolog, Python, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data and firmware. Further, files or other data may be decrypted using a suitable decryption module, for example.

The present may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, as also described above, the medium may be in the form of an integrated circuit, a hard disk, optical storage, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interlaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice reorganizer dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the foregoing description and drawings represent preferred or exemplary embodiments of the present invention, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes as applicable described herein may be made without departing from the spirit of the invention. One skilled in the art will further appreciate that, the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made b those skilled in the art without departing from the scope and range of equivalents of the invention.

What is claimed is:

1. An autonomous positioning device, for keeping a camera device automatically positioned in the direction of a user, the autonomous positioning device comprising:
   a base housing;
   a vertical stem housing portion extending vertically upward from the base housing, wherein at least a portion of the stem housing is rotatable relative to the base housing;
   an extension arm housing having a first end connected to a top portion of the vertical stem housing, wherein the first end of the extension arm housing pivots relative to the top portion of the vertical stem housing;
   a device holder attached to a second end of the extension arm housing; wherein the device holder having a first clamp and a second clamp, wherein the first clamp and the second clamp move to hold the camera device in the device holder;
   a sensor integrated to a top end of the device holder;
   an x-axis motor which is in a geared connection to the vertical stem housing and rotates the vertical stem housing;
   a y-axis motor which is in a geared connection to the extension arm housing and moves the extension arm housing relative to the vertical stem housing;
   a motor controller unit which controls the x-axis motor and the y-axis motor;
   a tangibly embodied processor and machine-readable instructions on a tangibly embodied memory within the autonomous positioning device;
   wherein the processor performing processing based on the machine readable instructions including:
      receive, by the processor, a plurality of sensor data from the sensor;
      create, by a bounding box processor portion, a body bounding box around a body of a user determined from the sensor data and a face bounding box around a face of the user determined from the sensor data;
      determine, by the bounding box processor portion, a set of body bounding box position data from the body bounding box and a set of face bounding box position data from the face bounding box;
      determine, by a subject position processor portion, a position of the user; wherein the subject position processor portion includes a bounding box pre-set threshold which the device uses to switch from using the body bounding box to the face bounding box; and
      wherein upon the pre-set threshold being met the subject position processor portion switches from using the body bounding box to the face bounding box;

determine, by the processor, a new x-axis position and a new y-axis position using the set of face bounding box position data; and communicate the new x-axis position and the new y-axis position information to the motor controller unit; and the motor controller unit controlling the x-axis motor to move to the new x-axis motor position and the y-axis motor to move to the new y-axis motor position.

2. The autonomous positioning device of claim 1, wherein the bounding box pre-set threshold is a distance between the user and the autonomous positioning device.

3. The autonomous positioning device of claim 1, wherein the processor determines the new x-axis position and the y-axis position by suppressing periphery movement data.

4. The autonomous positioning device of claim 1, wherein the processor determines the new x-axis position and the y-axis position by suppressing false positive data.

5. The autonomous positioning device of claim 1, further comprising:

a jitter control processor portion, which smooths motor movement of the x-axis motor and the y-axis motor to move to the new x-axis position and the new y-axis position.

6. The autonomous positioning device of claim 5, wherein the jitter control processor portion controls speed through a PID controller.

7. The autonomous positioning device of claim 5, wherein the jitter control processor portion controls speed through an electronic speed controller.

8. A autonomous positioning device comprising:

a base housing, wherein the base housing has a lid and the lid has an opening;

a vertical stem housing portion extending vertically upward from the base housing and attached to the base housing through the opening, wherein the vertical stem housing is rotatable relative to the base housing;

an extension arm housing having a first end connected to a top portion of the vertical stem housing, wherein the first end of the extension arm housing pivots relative to the top portion of the vertical stem housing;

a device holder attached to a second end of the extension arm housing;

the device holder having a base ledge, a first clamp and a second clamp, wherein a camera device is rested on the base ledge and the first clamp and the second clamp move to hold the camera device in the device holder;

a sensor integrated to a top end of the device holder;

an x-axis motor located in the base housing which is in a geared connection to the vertical stem housing and rotates the vertical stem housing;

a y-axis motor located in the vertical stem housing which is in a geared connection to the extension arm housing and moves the extension arm housing relative to the vertical stem housing;

a motor controller unit which controls the x-axis motor and the y-axis motor;

a tangibly embodied processor and machine-readable instructions on a tangibly embodied memory within the autonomous positioning device;

the processor including a bounding box processor portion which receives sensor frame data from the sensor, creates a body bounding box around a body of a user determined from the sensor data, and determines a set of body bounding box position data, and creates a face bounding box around a face of the user determined from the sensor data and determines a set of face bounding box position;

the processor performing processing based on the machine readable instructions including:

receive a plurality of sensor data from the sensor;

receive the set of body bounding box position data;

receive the set of face bounding box position data;

determine, by a subject position processor portion, a position of the user;

wherein the subject position processor portion includes a bounding box pre-set threshold which the device uses to switch from using the body bounding box to the face bounding box; and wherein upon the bounding box pre-set threshold being met the processor switches from using the body bounding box to the face bounding box:

determine, by the processor, a new x-axis position and a new y-axis position using the set of face bounding box position data;

wherein the processor suppresses periphery movement data; wherein the processor suppresses false positive data; a jitter control processor portion, managed by the processor which smooths motor movement of the x-axis motor and the y-axis motor movement to the new x-axis position and the new y-axis position;

a bounding box margin processor portion, managed by the processor, which determines an appropriate margin from an upper portion the top sensor frame based on the set of face bounding box position data; and communicate the new x-axis position and the new y-axis position information to the motor controller unit;

the motor controller unit controlling the x-axis motor to move to the new x-axis motor position and the y-axis motor to move to the new y-axis motor position.

9. The autonomous positioning device of claim 8, wherein the processor includes an out of frame search processor portion which determines movements of the x-axis motor and the y-axis motor until a new object is detected by the sensor.

10. The autonomous positioning device of claim 8, wherein the jitter control processor portion controls speed through a PID controller.

11. The autonomous positioning device of claim 8, wherein the jitter control processor portion controls speed through an electronic speed controller.

12. The autonomous positioning device of claim 8, further comprising a microphone array integrated into the autonomous positioning device.

13. The autonomous positioning device of claim 12, further comprising an audio processor portion, managed by the processor, which determines audio location from the microphone array and adjusts the determined new x-axis position and new y-axis position based on the audio location.

14. The autonomous positioning device of claim 8, wherein the pre-set threshold is a distance between the user and the autonomous positioning device.

15. The autonomous positioning device of claim 8, further comprising a position feedback processor portion which provides the x-axis motor position data and y-axis position data to the processor for use by the processor in determining a second new x-axis motor position and a second new y-axis motor position.

16. An autonomous positioning device comprising:

a rotatable x-axis assembly;

a moveable y axis assembly;

a device holder connected to the y-axis assembly;
a sensor integrated into the device holder;
an x-axis motor for moving the x-axis assembly;
a y-axis assembly for moving the y-axis assembly;
a motor controller unit which controls the x-axis motor and the y-axis motor;
a tangibly embodied processor and machine-readable instructions on a tangibly embodied memory within the autonomous positioning device;
the processor including a bounding box processor portion which receives sensor frame data from the sensor, creates a body bounding box around a body of a user determined from the sensor data, and determines a set of body bounding box position data from the body bounding box; and creates a face bounding box around a face of the user determined from the sensor data and determines a set of face bounding box position data to the processor;
the processor performing processing based on the machine readable instructions including:
  receive a plurality of sensor data from the sensor;
  receive the set of body bounding box position data;
  receive the set of face bounding box position data;
  determine, by a subject position processor portion, a position of the user;
  wherein the subject position processor portion includes a bounding box pre-set threshold which the device uses to switch from using the body bounding box to the face bounding box; and
  wherein upon the bounding box pre-set threshold being met the subject position processor portion switches from using the body bounding box to the face bounding box;
  determine, by the processor, a new x-axis position and a new y-axis position based on the set of face bounding box position data;
  wherein the processor suppresses periphery movement data;
  wherein the processor suppresses false positive data;
  a jitter control processor portion, managed by the processor which determines motor speed of the x-axis motor and the y-axis motor to move to the new x-axis position and the new y-axis position;
  a bounding box margin processor portion, managed by the processor, which determines an appropriate margin from an upper portion the top sensor frame based on the set of face bounding box position data; and
  communicate the new x-axis position and the new y-axis position information to the motor controller unit; and
the motor controller unit controlling the x-axis motor to move to the new x-axis motor position and the y-axis motor to move to the new y-axis motor position.

17. The autonomous positioning device of claim 16, wherein the jitter control processor portion controls speed through a PID controller.

18. The autonomous positioning device of claim 16, wherein the jitter control processor portion controls speed through an electronic speed controller.

19. The autonomous positioning device of claim 16, wherein the pre-set threshold is a distance between the user and the autonomous positioning device.

20. The autonomous positioning device of claim 16, wherein the x-axis motor can rotate in a continuous rotation beyond 360 degrees.

21. The autonomous positioning device of claim 1, wherein the pre-set threshold is based on a size of the body bounding box.

22. The autonomous positioning device of claim 8, wherein the pre-set threshold is based on a size of the body bounding box.

23. The autonomous positioning device of claim 16, wherein the pre-set threshold is based on a size of the body bounding box.

* * * * *